United States Patent
Sridhar et al.

(10) Patent No.: US 9,954,747 B2
(45) Date of Patent: *Apr. 24, 2018

(54) SYSTEMS AND METHODS OF SPECIFYING SERVICE LEVEL CRITERIA

(71) Applicant: International Business Machines Corporation, Armonk, NY (US)

(72) Inventors: S Sridhar, Irving, TX (US); Shamika S. Naik, Irving, TX (US); Thurman O. Pylant, Hurst, TX (US); Michael C. Rieser, Allen, TX (US); Steven D. Woodcock, Flower Mound, TX (US); Stuart D. Ander, Dallas, TX (US); Palanisamy A. Gounder, Irving, TX (US); Guy Briggs, Coppell, TX (US); Ashish Rajput, Irving, TX (US); Lalit Pant, Irving, TX (US); Michael G. Christiansen, Plano, TX (US)

(73) Assignee: International Business Machines Corporation, Armonk, NY (US)

( * ) Notice: Subject to any disclaimer, the term of this patent is extended or adjusted under 35 U.S.C. 154(b) by 108 days.

This patent is subject to a terminal disclaimer.

(21) Appl. No.: 14/533,372

(22) Filed: Nov. 5, 2014

(65) Prior Publication Data
US 2015/0067160 A1    Mar. 5, 2015

Related U.S. Application Data

(63) Continuation of application No. 11/116,032, filed on Apr. 27, 2005, now Pat. No. 8,903,949.

(51) Int. Cl.
| H04L 12/26 | (2006.01) |
| H04L 12/24 | (2006.01) |
| H04L 29/08 | (2006.01) |

(52) U.S. Cl.
CPC ........ H04L 43/062 (2013.01); H04L 41/5003 (2013.01); H04L 41/5006 (2013.01); H04L 43/16 (2013.01); H04L 67/06 (2013.01)

(58) Field of Classification Search
None
See application file for complete search history.

(56) References Cited

U.S. PATENT DOCUMENTS

| 6,446,200 B1 | 9/2002 | Ball et al. |
| 6,459,683 B2 | 10/2002 | Busuioc et al. |

(Continued)

OTHER PUBLICATIONS

Vashkudai et al., *Predicting the Performance of Wide Area Data Transfers*, Proceedings of the IEEE IPDPS, 2002.

(Continued)

*Primary Examiner* — Angela Nguyen
(74) *Attorney, Agent, or Firm* — Steven M. Greenberg, Esq.; CRGO Law

(57) ABSTRACT

Methods, systems, and articles of manufacture to generate file transfer monitoring criteria are disclosed. An example method obtains a file transfer log file from a first network entity and obtains from the transfer log file file transfer metadata that is associated with file transfer activity between the first network entity and a second network entity. The file transfer metadata is used to generate a file transfer monitoring criterion that is associated with selectively monitoring the file transfer activity between the first network entity and the second network entity. Service level criteria associated with the file transfer event is automatically updated based on the file transfer monitoring criterion.

11 Claims, 15 Drawing Sheets

(56) References Cited

U.S. PATENT DOCUMENTS

| | | |
|---|---|---|
| 6,553,568 B1 | 4/2003 | Fijolek et al. |
| 6,681,232 B1 | 1/2004 | Sistanizadeh et al. |
| 6,711,615 B2 | 3/2004 | Porras et al. |
| 7,002,974 B1 | 2/2006 | Deerman et al. |
| 2002/0003806 A1* | 1/2002 | McKinnon, III ... H04L 12/2801 370/437 |
| 2002/0143999 A1 | 10/2002 | Yamagami |
| 2003/0120771 A1* | 6/2003 | Laye .................. H04L 12/2602 709/224 |
| 2003/0225549 A1 | 12/2003 | Shay et al. |
| 2004/0199618 A1 | 10/2004 | Knight et al. |
| 2004/0205206 A1 | 10/2004 | Naik et al. |
| 2004/0225697 A1 | 11/2004 | Asano et al. |
| 2004/0236800 A1 | 11/2004 | Elkady et al. |

OTHER PUBLICATIONS

Porras et al., *Live Traffic Analysis of TCP/IP Gateways*, (Dec. 12, 1997), Proceedings of the 1998 ISOC Symposium on Network and Distributed Systems Security.

* cited by examiner

| # | DATE/ TIME | SRC | DST | PROCESS NAME | PROCESS ID | FILE NAME(S) | FILE TYPE(S) | FILE SIZE(S) | TRANSFER SIZE | TIMESTAMP |
|---|---|---|---|---|---|---|---|---|---|---|
| 1 | | | | | | | | | | |
| 2 | | | | | | | | | | |
| 3 | | | | | | | | | | |
| 4 | | | | | | | | | | |

LOG FILE

| | | | PROCESS TRANSFER HISTORY<br><PROCESS ID><br><SRC> => <DST> | | | |
|---|---|---|---|---|---|---|
| # | START TIME | END TIME | FILE NAME(S) | FILE SIZE(S) | TRANSFER SIZE | DURATION |
| 1 | | | | | | |
| 2 | | | | | | |
| 3 | | | | | | |
| 4 | | | | | | |
| MIN | | | | | | |
| AVG | | | | | | |
| MAX | | | | | | |

| | | | FILE TRANSFER HISTORY<br><FILE NAME><br><SRC> => <DST> | |
|---|---|---|---|---|
| # | START TIME | END TIME | FILE SIZE | DURATION |
| 1 | | | | |
| 2 | | | | |
| 3 | | | | |
| 4 | | | | |
| MIN | | | | |
| AVG | | | | |
| MAX | | | | |

| # | DATE/TIME | SLC ID | RULE NAME | NETWORK ENTITY | PROCESS NAME | PROCESS ID | EVENT TYPE | MESSAGE |
|---|---|---|---|---|---|---|---|---|
| 1 | | | | | | | | |
| 2 | | | | | | | | |
| 3 | | | | | | | | |
| 3 | | | | | | | | |

800 — ALERTS MONITOR 810
802

SERVICE LEVEL CRITERIA
RECOMMENDED CREATION 902     926

MONITOR TIME: [____] ... 904    914   SLC: <SLC ID>

REPETITION: [____▼]    SCHEDULE: [____■]

TRANSFER TYPE: [____▼] — 906

GRANULARITY: [____▼] — 908   916

SOURCE: [____▼] — 910    FILE NAMES: [____] ...

DESTINATION: [____▼] — 912

[ SAVE ] 924   [ PRINT ] 926   [ ACCEPT ] [ MODIFY ] [ REJECT ]

MONITOR TIME

START TIME RANGE: [____⬍] — 1002    SLC: <SLC ID>

END TIME RANGE: [____⬍] — 1004

DURATION: [____▼] — 1006    [ OK ] [ CANCEL ]

FIG. 10

SYSTEMS AND METHODS OF SPECIFYING SERVICE LEVEL CRITERIA

CROSS-REFERENCE TO RELATED APPLICATION

This application is a Continuation of U.S. application Ser. No. 11/116,032, filed Apr. 27, 2005, now allowed, which is incorporated herein by reference in its entirety.

FIELD OF THE DISCLOSURE

The present disclosure relates generally to processor systems and, more particularly, to systems and methods of specifying service level criteria.

BACKGROUND

Secure, reliable, and automated transfer of information over computer networks is often essential to successful operation of a business. Many businesses implement information transfer monitoring systems such as network monitoring systems that monitor not only intra-company information systems, but that also extends monitoring capabilities outside of the company to customers, vendors/suppliers, financial institutions, business partners, governmental and regulatory agencies, and other business-related entities. The monitored information or data can be structured or non-structured and can reside in files that may be as small as individual insurance claims or as large as multi-gigabyte files such as, for example, complex CAD-CAM drawings, consolidated financial data, or database backups to disaster recovery sites.

For example, in the financial services industry, business processes such as securities clearing and settlement, electronic funds transfer (EFT), automated clearing house (ACH), credit card processing, and cash management require secure, reliable, and automated data transfers. Other business processes that involve secure data transfer include, for example, telecom (billing), retail (inventory updates), and insurance (claims processing). Ensuring secure, reliable, and automated data transfers is often essential to service level agreements, regulatory requirements and associated penalties, and organizational production schedules.

Network and data transfer monitoring activities are often performed based on monitoring criteria. Monitoring criteria are used to inform a network monitoring system of the data transfers or file transfers that are scheduled to occur at particular times and the type of monitoring required for the transfers. Monitoring criteria are typically created or defined by information technology (IT) personnel who have access to details regarding network operations and data transfer operations. Over time, as data transfers are created, changed, or eliminated, monitoring criteria may become outdated or obsolete. IT personnel must manually update or maintain the monitoring criteria to ensure accurate network and data transfer monitoring. Growing business entities and expanding networks often result in increased data transfers that increase the need to maintain and create monitoring criteria. Overlooking data transfers or failing to maintain or create monitoring criteria increases the likelihood of data transfer errors and/or network failures.

BRIEF DESCRIPTION OF THE DRAWINGS

FIG. 3 is an example log file data structure that may be used to store raw file transfer metadata and that may be used to implement the file transfer log files of FIG. 2.

FIGS. 5 and 6 are example transfer history data structures that may be used to generate process transfer history and file transfer history based on the raw file transfer metadata of FIG. 3.

FIG. 8 is an example alerts monitor data structure that may be used to monitor file transfer information during operation of the example network monitor 102 of FIG. 1.

FIG. 9 is an example user interface screen that may be used to implement a service level criteria recommended creation screen.

FIG. 10 is an example user interface screen that may be used to implement an example monitor time selection screen.

DETAILED DESCRIPTION

Figure 1:
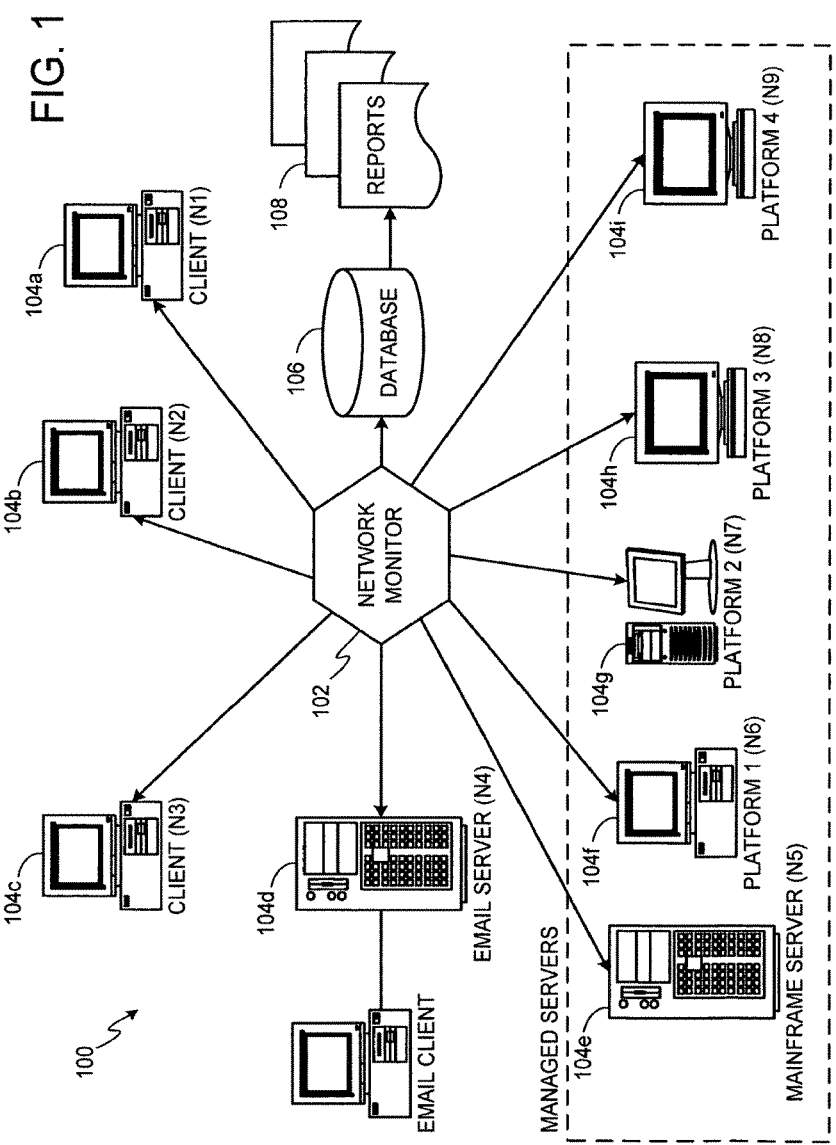
FIG. 1 is a diagram illustrating an example network monitoring system.

Although the following discloses example systems including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the following describes example systems, persons of ordinary skill in the art will readily appreciate that the examples provided are not the only way to implement such systems.

The example methods and systems described herein may be used to generate and/or update service level criteria (SLC) that are used to monitor data transfers such as process transfer events, file transfer events, or command transfer events within a network environment. SLC may include one or more parameters or file transfer monitoring criteria associated with data transfer details of one or more files transferred between two network entities (e.g., computer terminals, nodes, etc.) within a network or across different networks. Business entities often have network entities such as personal computers, servers, or terminals that transfer files to one another over a network at particular predetermined times. In many cases, file transfer events are repeated in a periodic fashion (e.g., once a day at 3:00 pm, once a week on Tuesday at 12:00 am, etc.). For example, a backup process may transfer a backup file or a plurality of backup files from a personal computer to a server every night at midnight. In another example, a financial institution may communicate one or more files of financial data from their server to a server of a business partner or client once per month on a particular day and at a particular time. SLC may be created each time a new file transfer event is scheduled or created and may include file transfer information (i.e., file transfer metadata) regarding the characteristics (e.g., transfer start time, transfer size, transfer type, etc.) of a particular data transfer. A network monitor may then use the file transfer information to ensure reliable and secure transfer of files. Existing SLC may be updated when characteristics (e.g., transfer start time, transfer size, etc.) of an existing scheduled file transfer are modified.

A network monitoring system may monitor the data transfers or file transfers that occur within a network environment or among different network environments based on SLC. For example, the network monitoring system may use SLC to determine whether one or more particular files are transferred within a network environment as expected. If the one or more particular files are transferred as expected, the network monitoring system may determine that no error occurred in the transfer of the one or more files. Otherwise, if the one or more particular files are not transferred as expected, the network monitoring system may be programmed (via rules that are described in greater detail below) to perform a responsive operation or to generate a notice (e.g., emit an audio alert, display an alert, log an error, send an e-mail, etc.) indicating that a file transfer error has occurred. IT personnel may then act appropriately in response to the notice to correct the network error and/or update SLC if the transfer of the one or more particular files was intentionally changed, canceled, etc.

The SLC may be generated and/or updated to accurately monitor file transfers in a network environment. For example, monitoring criteria of the SLC may be updated when a transfer time or transfer size of a particular file is changed or when any other information associated with the file transfer has changed. In addition to modifying monitoring criteria associated with changes in file transfer metadata, SLC updates may involve deleting or canceling SLC. SLC may be created when a new file transfer event is added to a network environment. The SLC may be generated and/or updated by using file transfer information collected using a monitoring criteria generator configured to work cooperatively with a network monitoring system. The file transfer information may include file transfer metadata (e.g., transfer start/stop times, transfer size, file names, file types, etc.) that are logged by network entities in file transfer log files each time a file transfer occurs. Specifically, the monitoring criteria generator may obtain file transfer log files from selected network entities and extract file transfer metadata to generate historical file transfer profiles. The historical file transfer profiles may be generated using data tables, graphs, or any other suitable data representation format that can be subsequently analyzed to generate file transfer monitoring criteria.

The monitoring criteria generator may be implemented as a module or plug-in that can be used in combination or configured to communicate with network monitoring systems. In this manner, as a network monitoring system monitors file transfer activity based on existing SLC, the monitoring criteria generator can generate file transfer monitoring criteria that can then be used to create or update SLC. For example, the monitoring criteria generation may determine whether existing SLC need to be updated and/or whether new SLC need to be created and update or create SLC accordingly based on the file transfer monitoring criteria to accurately monitor file transfers within a network environment.

As described in greater detail below, the monitoring criteria generator may operate in a manual mode or an automatic mode. In manual mode, the criteria generation system may generate recommendations for a user to create or update SLC based on the file transfer monitoring criteria. The monitoring criteria generator may be configured to then obtain input from a user instructing the monitoring criteria generator to accept, modify, or reject the recommendations to create an SLC or update an existing SLC based on the recommended file transfer monitoring criteria. In automatic mode, the monitoring criteria generator may update SLC automatically based on the file transfer monitoring criteria.

Although the example systems and methods are generally described herein with respect to file transfers, the example methods and systems may be implemented with any other type of transfers (e.g., process transfers, command transfers, etc.).

Now, turning in detail to FIG. 1, an example network monitoring system 100 may be configured to monitor file transfers based on SLC that are generated and/or updated using the example methods and systems described herein. Although the example methods and systems described herein may be configured to work with the example network monitoring system 100, the example methods and systems may also be configured to work with other types of network monitoring systems. As shown in FIG. 1, the example network monitoring system 100 includes an example network monitor 102, a plurality of network nodes or network entities 104a-104i, and a database 106, all of which are communicatively coupled as shown.

The example network monitor 102 may be configured to ensure secure and reliable transfer of data or files in a network by monitoring file transfer events between network entities (e.g., the network entities 104a-i). The file transfers may occur within the same network (i.e., intranetwork file transfers) or between different networks (i.e., internetwork file transfers). The network monitor 102 may monitor file transfer events based on individual file transfers or processes. A process transfer event may involve transferring one or more files and may include one or more sub-processes. Each sub-process may be a single file transfer, a plurality of file transfers, or a specific command. The network monitor 102 may be configured to selectively monitor a process or file transfer event between a specific source network entity and a specific destination network entity based on source and destination addresses provided in SLC. The network monitor 102 may be a software application that runs on a server communicatively coupled to a local network or to a plurality of distributed networks. Connect Control Center® (produced and sold by Sterling Commerce of Dublin, Ohio) is an example network monitor that is commercially available and that may be used to implement the network monitor 102. Of course, any other network monitoring application or system may be used to implement the network monitor 102.

The network monitor 102 ensures that data transfers or file transfers occur as expected based on SLC. The network monitor 102 may monitor file transfer events or processes based on data transfer metadata (i.e., information about data transfer events) such as, for example, file transfer metadata (i.e., information about a file transfer event) or process metadata (i.e., information about a process event). For purposes of simplicity, although the example methods and systems described herein may be configured to work with any data transfer metadata, the example methods and systems are described herein with respect to file transfer metadata. The network monitor 102 may obtain file transfer monitoring criteria from SLC and monitor file transfer events based on the file transfer monitoring criteria. As described in greater detail below in connection with FIGS. 3-6 and 9-11, the file transfer metadata may include a transfer start time, a transfer type, source and destination network entities performing the transfer, etc.

The network monitor 102 may determine whether a file transfer event occurred as expected based on the monitoring criteria and the file transfer metadata. For example, the network monitor 102 may determine that a secure and reliable file transfer occurred if the file transfer occurred with conformance to parameters defined by the file transfer monitoring criteria. Additionally, the network monitor 102 may determine that a file transfer was not secure or reliable if the file transfer event did not occur at all or did not occur in conformance to the file transfer monitoring criteria. In this case, the network monitor 102 may be configured to generate an alert or perform some other operation based on a rule in response to detecting a non-conformant file transfer event. Rules are described below in connection with the alerts monitor data structure 800 of FIG. 8.

Each of the network entities 104a-i may be a processor system that is configured to transfer data or files to one or more of the network entities 104a-i. The network entities 104a-i may be part of the same network, in which case file transfers between the network entities 104a-i are intranetwork file transfers. Alternatively, some or all of the network entities 104a-i may be part of different networks, in which case file transfers between the network entities 104a-i are internetwork file transfers.

As shown in FIG. 1, the network entities 104a-i may be implemented using one or more different hardware platforms such as, for example, personal computers, servers, mainframe terminals, etc. Additionally, the network entities 104a-i may utilize one or more different software platforms such as, for example, Windows®, UNIX, HP OpenView®, HP NonStop®, OS/400®, OS/390®, etc. As described in greater detail below in connection with FIG. 2, file transfers between the network entities 104a-i may be managed and performed via file transfer applications executed by the network entities 104a-i.

The database 106 is communicatively coupled to the network monitor 102 and may be used to store information related to monitoring file transfer events. The database 106 may be implemented using a processor system (e.g., a computer, a server, etc.) having a memory storage device. In an example implementation, the network monitor 102 and the database 106 may be implemented using the same processor system. Although one database is shown, any number of databases may be communicatively coupled to the network monitor 102. The database 106 may include one or more types of information. For example, the database 106 may include SLC, rules, and/or historical transfer event information (e.g., the information illustrated in the transfer history tables 500 and 600 of FIGS. 5 and 6) that may be used to generate SLC. The information stored in the database 106 may be used to generate reports 108 associated with the security and reliability of file transfers, historical data transfer information, recommended monitoring criteria, SLC, configuration information, etc.

Figure 2:
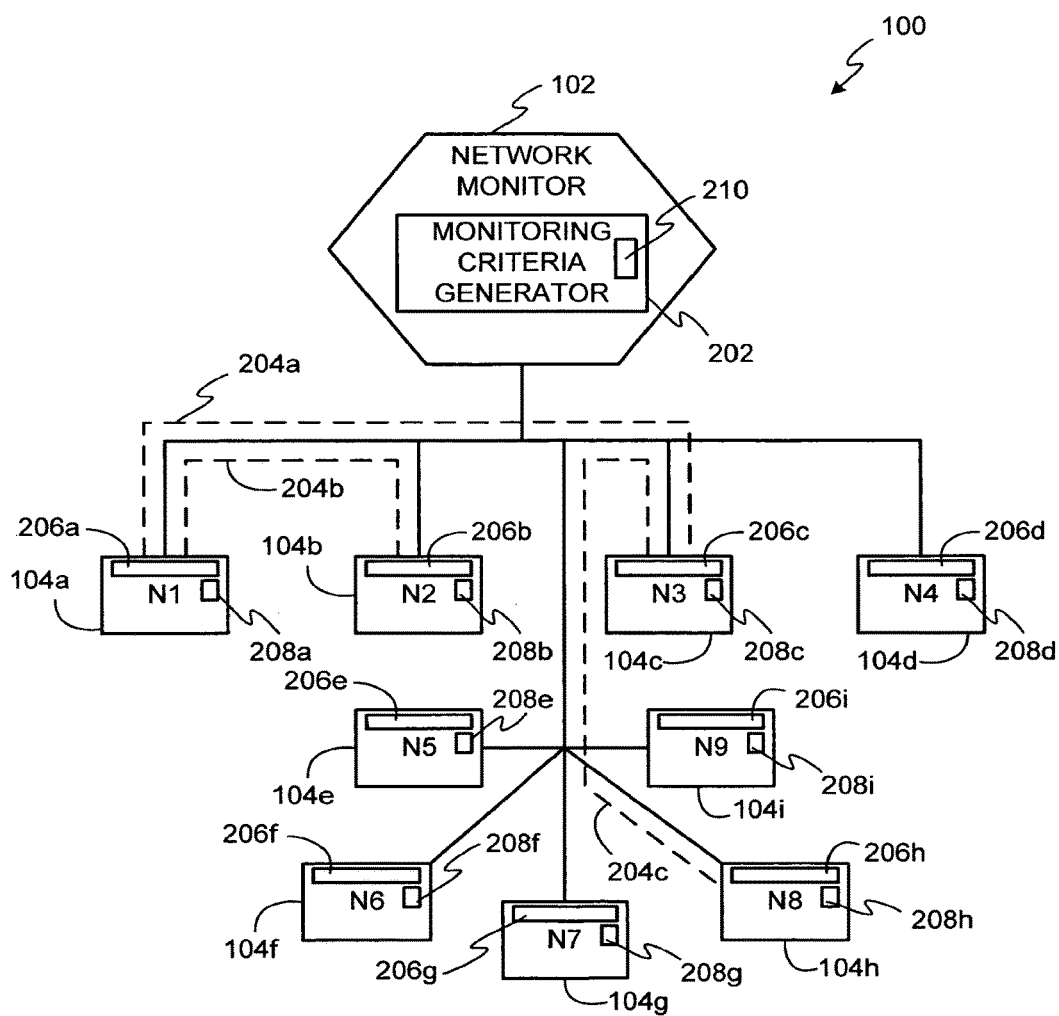
FIG. 2 is a block diagram of the network monitoring system of FIG. 1 illustrating a monitoring criteria generator.

FIG. 2 is a detailed block diagram of the example network monitoring system 100 of FIG. 1 illustrating a monitoring criteria generator 202. The monitoring criteria generator 202 may be a software program that can be used to implement the methods and systems described herein. More specifically, the monitoring criteria generator 202 may be configured to monitor data transfers or file transfers between the network entities 104a-i and generate recommended monitoring criteria based on analyses of file transfer characteristics or file transfer metadata. The monitoring criteria generator 202 may then provide to a user recommendations regarding creating new SLC and/or updating existing SLC. Additionally, the monitoring criteria generator 202 may automatically update SLC based on the recommended monitoring criteria. The recommended monitoring criteria may define parameter values associated with file transfer to more accurately monitor file transfer events. For example, if the monitoring criteria generator 202 determines that a new file transfer event has been created or scheduled, the monitoring criteria generator 202 may generate recommended monitoring criteria (e.g., file transfer start and end times, amount of information to be transferred, etc.) based on the file transfer metadata of the new file transfer.

The monitoring criteria generator 202 may be a standalone software application or a software plug-in. If the monitoring criteria generator 202 is a standalone software application, it may run independent of the network monitor application 102 and may store information such as recommended monitoring criteria or SLC in a memory that is accessible by the monitoring criteria generator 202 and the network monitor 102. If the monitoring criteria generator 202 is implemented as a software plug-in, a processor system (e.g., a server) may execute the monitoring criteria generator 202 as a software component of the network monitor 102.

The monitoring criteria generator 202 is configured to monitor a plurality of file transfer events that occur between the network entities 104a-i. Example file transfers are represented in FIG. 2 as a first file transfer 204a between a network entity N1 104a and a network entity N3 104c, a second file transfer 204b between the network entity N1 104a and a network entity N2 104b, and a third file transfer 204c between the network entity N3 and a network entity N8 104h.

File transfers (e.g., the file transfers 204a-c) between the network entities 104a-i are performed by file transfer applications executed by the network entities 104a-i. Specifically, as shown in FIG. 2, each of the network entities 104a-i includes a respective one of a plurality of file transfer applications 206a-206i. The file transfer applications 206a-i may be implemented using, for example, file transfer protocol (FTP) applications, hypertext terminal protocol (HTTP) applications, peer-to-peer applications, etc. Example file transfer applications include Connect:Direct® and Connect:Enterprise® (produced and sold by Sterling Commerce of Dublin, Ohio). Of course, the example methods and systems described herein may be implemented in combination with other file transfer applications.

As shown in FIG. 2, each of the network entities 104a-i may include one of a plurality of file transfer log files 208a-i. Each of the file transfer log files 208a-i may be stored in a respective memory and include file transfer metadata associated with files or data communicated between a respective one of the network entities 104*a-i* and another one of the network entities 104*a-i*. More specifically, as described in greater detail below in connection with FIG. 3, each of the file transfer applications 206*a-i* may be configured to log, record, or store entries in a respective one of the file transfer log files 208*a-i* that indicate each time a file is communicated or received and other file transfer metadata associated with a file transfer event. During a file transfer between a source network entity and a destination network entity, the file transfer application of each of the network entities generates log entries that are substantially similar or identical to one another and stores the log entries in their respective log files. For example, each of the file transfer applications may log the same file name, file size, transfer time, etc. In this manner, if two of the network entities 104*a-i* are configured to transfer data only to one another, the file transfer log files generated in each of the two network entities will be substantially similar or identical to one another.

The monitoring criteria generator 202 may be configured to generate recommended monitoring criteria based on the file transfer metadata stored in the file transfer log files 208*a-i*. As described below in connection with the example method of FIG. 12, the monitoring criteria generator 202 may be configured to obtain one or more of the file transfer log files 208*a-i* from the network entities 104*a-i*, extract raw file transfer metadata from the one or more of the log files 208*a-i*, process the raw file transfer metadata and analyze the processed file transfer metadata to generate the recommended monitoring criteria.

The monitoring criteria generator 202 may obtain the log files 208*a-i* based on a transfer event priority list 210. A user or the monitoring criteria generator 202 may generate the transfer event priority list 210 to specify an importance level or priority level for each file transfer between the network entities 104*a-i*. Although the network entities 104*a-i* may perform many file transfers, some file transfers may not be important enough or sufficiently critical to warrant monitoring, while other file transfers may be of high importance and may require constant or frequent monitoring. The importance associated with monitoring each file transfer may be represented using a priority level. A user may assign a priority level to each file transfer, store in the transfer event priority list 210 the priority levels, and for each priority level also store in the transfer event priority list 210 a process transfer identifier (e.g., file names, process ID's, process names, etc.), and a source and/or destination network entity address.

A file transfer event denoted or marked as high priority or important may be labeled a master process. Each master process is capable of triggering an SLC specifying process. A user may configure (e.g., enable) one or more of the master processes to trigger an SLC specifying process. An SLC specifying process may be configured to update an existing SLC or create a new SLC based on recommended monitoring criteria generated by the monitoring criteria generator 202. The SLC specifying process may be implemented using the example SLC specifying process 1500 of FIG. 15.

Although the monitoring criteria generator 202 collects file transfer metadata for file transfer events of all master processes, a master process triggers an SLC specifying process only if it is marked or designated as capable of triggering an SLC specifying process. Every master process causes the monitoring criteria generator 210 to collect file transfer information (e.g., file transfer metadata values described below in connection with FIGS. 3-7) for all master processes and stores the file transfer information in, for example, a transfer history data structure (e.g., the transfer history data structures 500 and 600 of FIGS. 5 and 6). However, a master process that triggers an SLC specifying process further causes the monitoring criteria generator 202 to generate recommended monitoring criteria based on file transfer metadata associated with that master process and create or update SLC for that master process.

The monitoring criteria generator 202 may execute or perform an SLC specifying process when sufficient file transfer information is collected for the master processes that triggered the SLC specifying process. For example, when a master process triggers an SLC specifying process, if the monitoring criteria generator 202 has not collected sufficient file transfer information on which to perform analyses, the monitoring criteria generator 202 may ignore the trigger. The monitoring criteria generator 202 may ignore subsequent triggers until the monitoring criteria generator 202 has collected sufficient file transfer information on which to perform analyses to generate recommended monitoring criteria. In cases where a master process is designated as not capable of triggering an SLC specifying process and after some time a user designates that master process as capable of triggering an SLC specifying process, the monitoring criteria generator 202 may use any file transfer information previously collected in connection with that master process to generate monitoring criteria.

FIG. 3 is an example log file data structure 300 that may be used to implement the file transfer log files 208*a-i* of FIG. 2. The example log file data structure 300 includes a plurality of log entries 302. The log entries 302 include file transfer metadata corresponding to file transfers (e.g., the file transfers 204*a-c* of FIG. 2) between network entities (e.g., the network entities 104*a-i* of FIGS. 1 and 2). The file transfer metadata shown by way of example in the example log file data structure 300 may be stored in a date/time column 304, a source (e.g., a source address) column 306, a destination (e.g., a destination address) column 308, a process name column 310, a process ID column 312, a file name(s) column 314, a file type(s) column 316, a file size(s) column 318, a transfer size column 320, and a timestamp column 322. Of course, in alternative implementations of the example log file data structures 300, the example log file data structure 300 may include fewer or more column types to store other types of file transfer metadata.

The log entries 302 may be generated based on event occurrences or may be generated periodically. For example, each of the log entries 302 may be generated by the file transfer applications 206*a-i* based on predetermined time intervals or periods. In this case, during times when no files are transferred the file transfer applications 206*a-i* may generate log entries in the log file data structure 300 that only have time/date and timestamp information. Alternatively, to avoid or prevent generating empty log entries, the transfer applications 206*a-i* may be configured to periodically generate log entries only when a file transfer is occurring. In an event driven log file generation implementation, the file transfer applications 206*a-i* may be configured to generate log entries in response to predetermined events such as, for example, at the start of a file transfer and/or at the end of a file transfer.

The file transfer metadata stored in the log file data structure 300 may include raw metadata values that represent a snapshot of file transfer conditions at an instant in time when a file transfer was occurring. During subsequent processes, the raw file transfer metadata values may be processed to determine processed file transfer metadata values that may be used during subsequent analyses to generate recommended monitoring criteria. In some cases, the process metadata values are more relevant or meaningful or provide a better understanding of certain aspects of a file transfer event. For example, the log file data structure 300 may include raw timestamp metadata values stored in the timestamp column 322 that, when analyzed individually, provide substantially non-relevant information. However, the monitoring criteria generator 202 may process the raw timestamp metadata values to determine relatively more relevant processed metadata values. For example, the monitoring criteria generator 202 may determine the start time of a file transfer by identifying the first timestamp generated for that file transfer. In similar fashion, the monitoring criteria generator 202 may determine the end time of the file transfer by identifying the last timestamp generated for that file transfer. Further, the monitoring criteria generator 202 may determine the duration of a file transfer by subtracting the last timestamp generated for that file transfer from the first timestamp generated for that file transfer. A file transfer size is another processed metadata value that the monitoring criteria generator 202 may determine based on the raw file transfer metadata values stored in the log file data structure 300. For example, the monitoring criteria generator 202 may determine the file transfer size by reading or obtaining the transfer size metadata value stored in the transfer size metadata column 320 for the last one of the entries 302 associated with that file transfer.

Each of the file transfer metadata is associated with a particular characteristic of each process or file transfer. The source and destination columns 306 and 308 may be used to indicate the source and destination addresses or identifiers of the network entities 104a-i (FIG. 1) that perform a process or file transfer. The process name and process ID columns 310 and 312 may be used to identify particular processes. The file name(s) column 314 may be used to store the names of the one or more files transferred as part of a particular process or file transfer event. The file type(s) column 316 may be used to indicate the type or types of files (e.g., database files, text file, encrypted file, financial file, image file, etc.) transferred during a particular process or file transfer event. The file size(s) column 318 may be used to store the size of each file transferred during a process or file transfer event.

The transfer size column 320 may be used to store the overall or total transfer size of all the data transferred during a process or file transfer event. For a process transfer event, the transfer size for a particular process may be determined by adding the sizes of all of the files transferred in the process transfer event. For a file transfer event, the value stored in a data field of the transfer size column 320 may be substantially equal or similar to the value stored in a corresponding data field of the file size(s) column 318 because only one file is transferred during a file transfer event.

The timestamp column 322 may be used to store timestamp metadata associated with the time at which each one of the log entries 302 was generated. The timestamp metadata may be used to determine the duration for a process or file transfer event by subtracting a last entry timestamp value associated with a process or file transfer event from a first entry timestamp value associated with the process or file transfer event.

Figure 4:
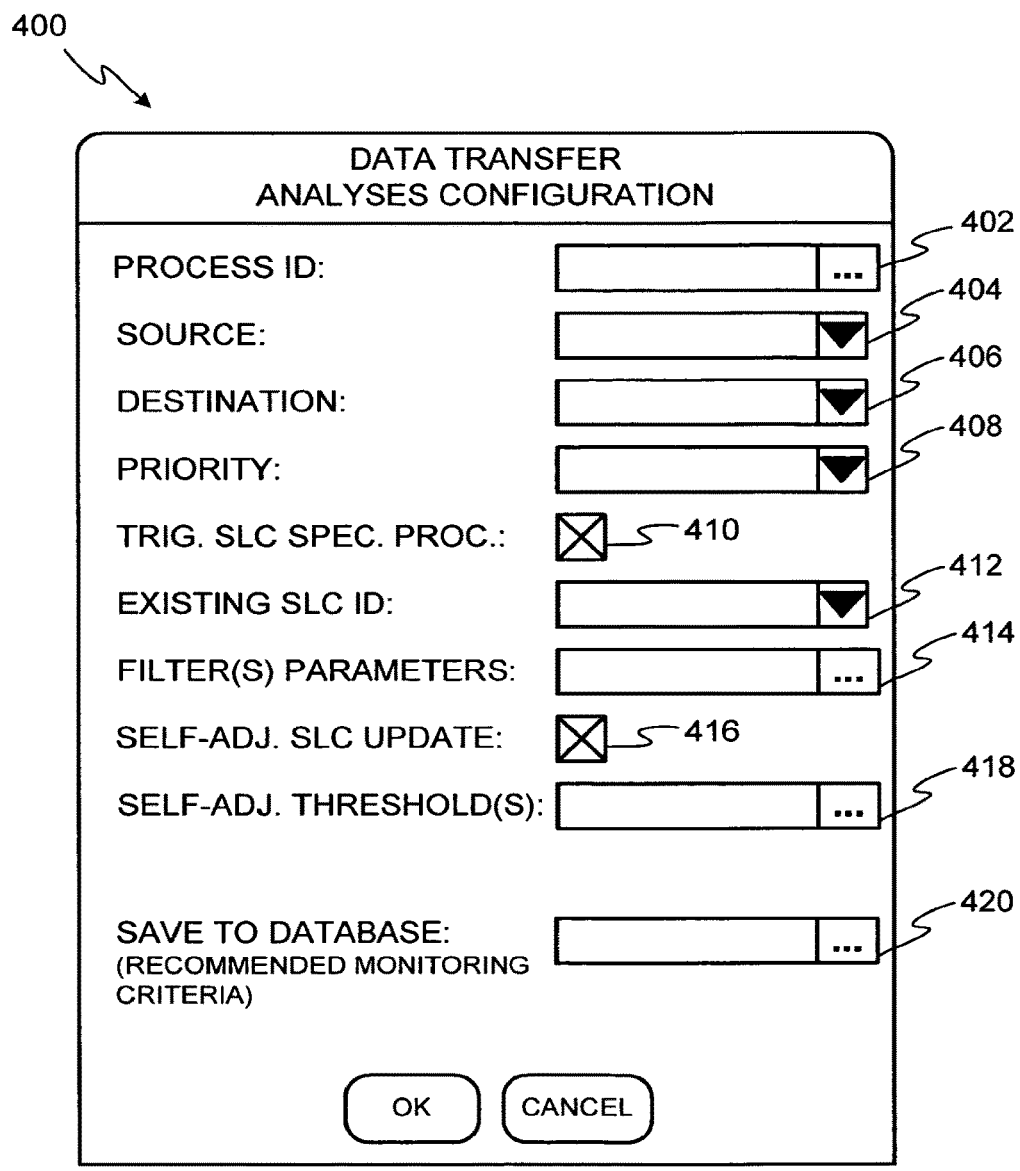
FIG. 4 is an example configuration screen that may be used to configure analyses of data transfer activity.

FIG. 4 is an example analyses configuration screen 400 that may be used to configure analyses of data transfer events (e.g., process and file transfer events). The monitoring criteria generator 202 (FIG. 2) may generate the example analyses configuration screen 400 to enable a user to specify or select process or file transfer events that the monitoring criteria generator 202 should monitor. In addition, the example analyses configuration screen 400 may be used to specify how the selected process or file transfer events should be monitored. A user may use the example analyses configuration screen 400 to configure the monitoring criteria generator 202 to monitor process or file transfer events for which SLC already exist and also process or file transfer events for which SLC do not exist.

As shown in FIG. 4, the example analyses configuration screen 400 includes a plurality of configuration parameters that include a process ID parameter field 402, a source parameter field 404, a destination parameter field 406, a priority parameter field 408, a trigger SLC specifying process parameter field 410, an existing SLC ID parameter field 412, a filter(s) parameters field 414, a self-adjusting SLC update field 416, a self-adjusting threshold(s) field 418, and a save to database field 420. The process ID parameter field 402 may be used to specify an identification value or code that corresponds to a selected process or file transfer event. A value or code stored in the process ID parameter field 402 may be associated with the values stored in the process ID column 312 of FIG. 3. In some cases, a user may want to use the same analyses configuration to monitor or analyze a plurality of process or file transfer events, each having a unique or different process ID. In these cases, a user may enter wildcard characters (e.g., the asterisk (*) character, the question mark (?) character, etc.) in the process ID parameter field 402. For example, if all financial data transactions in a corporate network have a process ID beginning with the letters 'FN', a user may enter wildcard strings such as, for example, the strings 'FN*', 'FN*', 'FN*3', etc., in the process ID parameter field 402 to specify that the analyses configuration should be used to monitor or analyze all of the financial data transactions. Although not shown, the example analyses configuration screen 400 may also include a process name parameter field (not shown) and/or a file name parameter field (not shown) to specify process of file transfer events. The process name parameter field may be associated with process names stored in the process name column 310 of FIG. 3. The file name parameter field may be associated with the file name(s) column 314 of FIG. 3.

The source and destination parameter fields 404 and 406 may be used to specify the source and destination addresses of the network entities 104a-i (FIGS. 1 and 2) involved in the selected process or file transfer event. Addresses or identification information specified in the source and destination parameter fields 404 and 406 may be associated with the information stored in the source and destination columns 306 and 308 of FIG. 3.

The priority parameter field 408 may be used to specify a level of importance or priority level (e.g., specifying a master process as described above in connection with FIG. 2) associated with monitoring or analyzing the selected process or file transfer events. The priority levels specified in the priority parameter field 408 may be stored in the transfer event priority list 210 described above in connection with FIG. 2. The trigger SLC specifying process parameter field 410 may be used to specify whether the selected process or file transfer events should trigger an SLC specifying process as described above in connection with FIG. 2. The existing SLC ID parameter field 412 may be used to specify if an SLC has already been created for the selected process or file transfer event. The filter(s) parameters field 414 may be used to specify one or more filters that the monitoring criteria generator 202 should use when analyzing file transfer metadata (e.g., the raw file transfer metadata obtained from the log file 300 of FIG. 3 or processed file transfer metadata). For example, selecting the filter(s) parameters field 414 may cause the monitoring criteria generator 202 to display another screen (not shown) having a plurality of filters and associated parameter values from which a user may select one or more filters and filter parameters. Filters may be used to detect patterns or trends in file transfer metadata using different analysis techniques and may include many types of statistical filters such as, for example, temporal filters, size filters, file type filters, etc. For example, a user may specify a filter that causes the monitoring criteria generator 202 to analyze process or file transfers that occurred within the last thirty days or to analyze the most recent 500 transfers. The filter(s) parameters field 414 may also be used to specify mathematical analysis functions such as, for example, an exponentially smoothed moving average function, a mean (average) function, a median function, etc.

In addition, the filter(s) parameters field 414 may be used to select the type of file transfer metadata (e.g., source/destination metadata, transfer size metadata, timestamp metadata, etc.) that the monitoring criteria generator 202 should obtain and/or analyze and the type of monitoring criteria that the monitoring criteria generator 202 should generated based on the file transfer metadata. For example, a user may specify in the filter(s) parameters field 414 to only extract timestamp metadata and process ID metadata from one of the log files 208a-e. A user may further specify to only generate start and end time monitoring criteria based on the timestamp metadata values and the process ID metadata values.

The self-adjusting SLC update field 416 may be used to enable a self-adjusting SLC update feature that enables the monitoring criteria generator 202 to automatically update an SLC based on recommended monitoring criteria. The self-adjusting SLC update field 416 may be used to configure the monitoring criteria generator 202 to automatically update SLC at predetermined intervals (e.g., every two weeks) or in response to generating recommended monitoring criteria. For instance, after the monitoring criteria generator 202 generates recommended monitoring criteria as described below in connection with the example method of FIG. 14, if the self-adjusting SLC update field 416 is selected, the monitoring criteria generator 202 may automatically update an SLC based on the recommended monitoring criteria without waiting for user input to accept or approve the update. If the self-adjusting update field 416 is not selected, the monitoring criteria generator 202 may present recommended monitoring criteria to a user via, for example, an example SLC recommended update screen 1100 described below in connection with FIG. 11, and wait for user input associated with the recommended monitoring criteria before updating the SLC.

The self-adjusting threshold(s) field 418 may be used to define one or more thresholds associated with the self-adjusting SLC update feature described above. A user may specify one or more self-adjusting threshold values in the self-adjusting threshold(s) field 418 to define the conditions under which the monitoring criteria generator 202 should automatically update an SLC. For example, a user may specify a start time threshold of two hours that enables the monitoring criteria generator 202 to update the start time criteria of an SLC only if the difference between the existing start time criteria and the recommended start time criteria is less than two hours.

The save to database field 420 may be used to specify whether the monitoring criteria generator 202 should store recommended monitoring criteria to a database (e.g., the database 106 of FIG. 1). For example, if a user wants to export any recommended monitoring criteria generated by the monitoring criteria generator 202 for a particular process or file transfer event, the user may specify in the save to database field 420 the name of the database file to which the monitoring criteria generator 202 should export the recommended monitoring criteria. The exported recommended monitoring criteria may subsequently be printed from the database or imported at a later time to, for example, create or update SLC.

FIGS. 5 and 6 are example transfer history data structures 500 and 600 that may be used to generate process transfer history and file transfer history, respectively, based on the raw and/or processed file transfer metadata described above in connection with FIG. 3. Each of the example transfer history data structures 500 and 600 may be generated for a particular file transfer event that may be repeated according to a predetermined schedule. The monitoring criteria generator 202 (FIG. 2) may generate and update the transfer history data structures 500 and 600 based on the file transfer metadata obtained from the log files 208a-i and subsequently use the transfer history data structures 500 and 600 to generate recommended monitoring criteria.

The monitoring criteria generator 202 may store raw file transfer metadata or processed file transfer metadata in the transfer history data structures 500 and 600. For example, in the case of file names, the monitoring criteria generator 202 may obtain file names stored as raw file transfer metadata in the example log file 300 (FIG. 3) and store the file names as raw file transfer metadata in the transfer history data structures 500 and 600. In the case of start times and end times, the monitoring criteria generator 202 may process raw timestamp metadata stored in the example log file 300 prior to storing process start time and end time metadata in the transfer history data structures 500 and 600.

The monitoring criteria generator 202 may generate recommended monitoring criteria based on the data contained or stored in the transfer history data structures 500 and 600. For example, the monitoring criteria generator 202 may detect patterns or trends in file transfers based on the file transfer metadata stored in the transfer history data structures 500 and 600 and determine if the patterns or trends are different from what existing or current SLC are configured to monitor. If the patterns or trends indicate different characteristics than those which current SLC are configured to monitor, the monitoring criteria generator 202 may generate recommended monitoring criteria to create new SLC or to update existing SLC.

The example process transfer history data structure 500 of FIG. 5 may be used to store file transfer metadata associated with process events. The file transfer metadata columns in the process transfer history data structure 500 includes a start time column 502, an end time column 504, a file name(s) column 506, a file size(s) column 508, a transfer size column 510, and a duration column 512. The file name(s) column 506, the file size(s) column 508, and the transfer size column 510 are substantially similar or identical to the file name(s) metadata column 314, the file size(s) metadata column 318, and the transfer size metadata column 320 described above in connection with FIG. 3. The start and end time columns 502 and 504 may be used to store the times between which each process event occurred. The time values stored in the start and end time column 502 may be obtained from the timestamps stored in the timestamp metadata column 322 of FIG. 3. More specifically, the monitoring criteria generator 202 may read a timestamp value stored in one of the log entries 302 (FIG. 3) that indicates the start or beginning of a process transfer and store the timestamp in the start time column 502. Additionally, the monitoring criteria generator 202 may read a timestamp value stored in another one of the log entries 302 (FIG. 3) that indicates the end or completion of the process transfer and store the timestamp in the end time column 504. The duration column 512 may be used to store the amount of time required to transfer all of the files of a process event. The values stored in the duration column 512 may be generated by subtracting values stored in the end time column 504 from values stored in the start time column 506.

The example file transfer history data structure 600 of FIG. 6 may be used to store file transfer metadata associated with individual file transfer events (e.g., file transfers that are not part of a process). The file transfer history data structure 600 includes a start time column 602, an end time column 604, a file size column 606, and a duration column 608. Although the example transfer history data structures 500 and 600 include a particular number of and type of file transfer metadata columns, the data structures 500 and 600 may be implemented using any number of and type of file transfer metadata columns.

As shown in FIGS. 5 and 6, the transfer history data structures 500 and 600 include statistics rows 514 and 610. The statistics rows 514 and 610 may be implemented using formulas that generate minimum (MIN), maximum (MAX), and average (AVG) statistical values for the metadata values stored in the metadata columns. The monitoring criteria generator 202 may update the statistics rows 514 and 610 each time file transfer metadata values are added to the transfer history data structures 500 and 600. Although, the statistics rows 514 and 610 are shown by way of example in FIGS. 5 and 6 as having only MIN, MAX, and AVG, the statistics rows 514 and 610 may be implemented using fewer or more statistical values.

Figure 7:
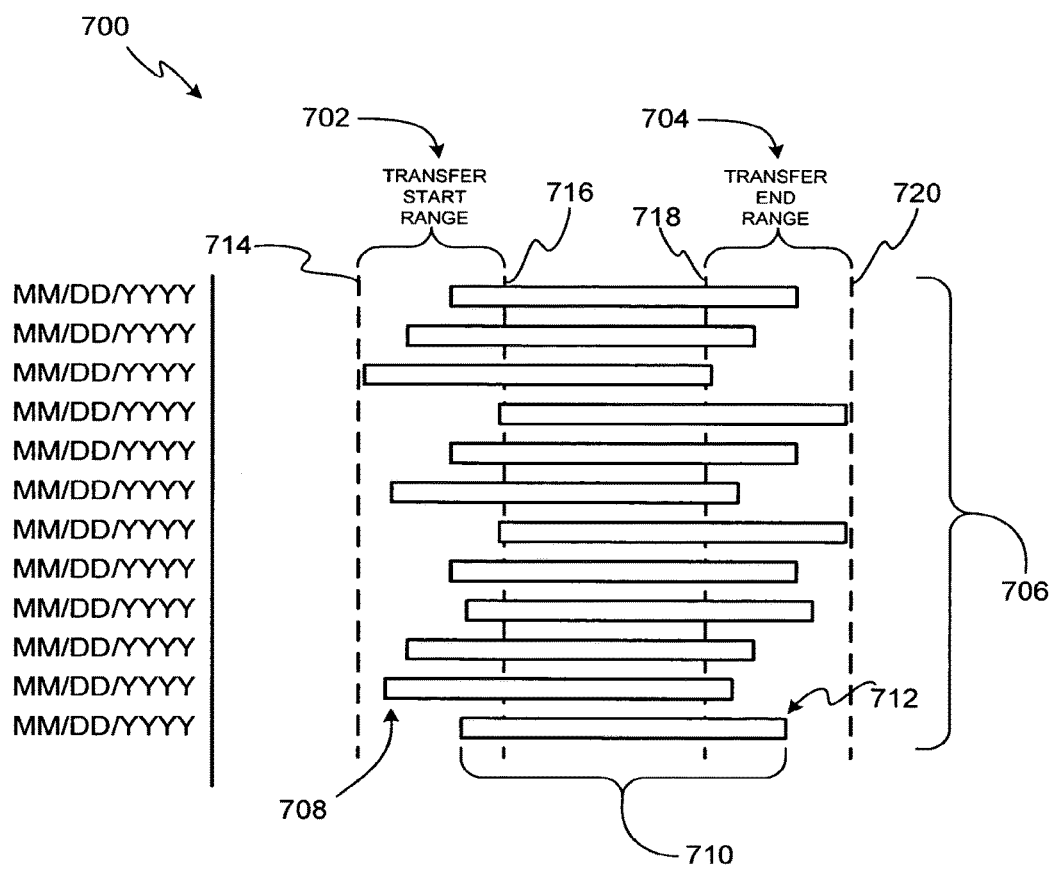
FIG. 7 is an example transfer time chart showing a transfer start range and a transfer end range for a repeated file transfer or process.

FIG. 7 is an example transfer time chart 700 showing a transfer start range 702 and a transfer end range 704 for a repeated file transfer or process. The example transfer time chart 700 includes a plurality of transfer time data 706 representing transfer start times 708, transfer durations 710, and transfer end times 712. The example transfer time chart 700 may be generated in connection with the example process transfer history data structure 500 (FIG. 5) or the example file transfer history data structure 600 (FIG. 6). For example, if generated in connection with the example process transfer history data structure 500 (FIG. 5), one of the transfer start times 708 may indicate the time at which a network entity (e.g., one of the network entities 104a-i of FIGS. 1 and 2) started to transfer a first file of a process event, a corresponding one of the transfer durations 710 may indicate the amount of time required to transfer all of the files of the process event between two of the network entities 104a-i, and a corresponding one of the transfer stop times 712 may indicate the time at which the network entities 104a-i finished transferring the last file of the process event. Alternatively, if the example transfer time chart 700 is generated in connection with the example file transfer history data structure 600 (FIG. 6), one of the transfer start times 708 may indicate the time at which one of the network entities 104a-i started to transfer a file during a file transfer event, a corresponding one of the transfer durations 710 may indicate the amount of time required to transfer the file between two of the network entities 104a-i, and a corresponding one of the transfer stop time 712 may indicate the time at which the network entities 104a-i stopped transferring the file.

The monitoring criteria generator 202 (FIG. 2) may use the transfer start and end ranges 702 and 704 to generate the MIN, AVG, and MAX values of the statistics rows 514 and 610 (FIGS. 5 and 6). As shown in FIG. 7, the transfer start range 702 includes a minimum start time marker 714 and a maximum start time marker 716 and the transfer end range 704 includes a minimum end time marker 718 and a maximum end time marker 720. Each time new transfer time data 706 is added to the example transfer time chart 700, the monitoring criteria generator 202 may calculate a time position or a time value at which the time markers 714, 716, 718, and 720 are located in the example transfer time chart 700 to determine the earliest (i.e., the minimum) and the latest (i.e., the maximum) start times and end times of a process transfer event or file transfer event. The monitoring criteria generator 202 may then store the minimum and maximum start and end times calculated in connection with the example transfer time chart 700 in the MIN and MAX rows of the statistics rows 514 and 610 of FIGS. 5 and 6. Although not shown, average start and end time markers may also be implemented in the example transfer time chart 700 and used to determine average start and end time values that are stored in the AVG row of the statistics rows 514 and 610. In an alternative implementation, the time values of the start and end time minimum and maximum markers 714, 716, 718, and 720 may be determined based on the MIN and MAX values stored in the statistics rows 514 and 610 for the start and end time columns 502, 504, 602, and 604.

FIG. 8 is an example alerts monitor data structure 800 that may be used to monitor file transfer information during operation of the example network monitoring system 100 of FIG. 1. The example network monitor 102 (FIGS. 1 and 2) may monitor a plurality of process transfer events and/or file transfer events based on information stored in the example alerts monitor data structure 800. Specifically, the example alerts monitor data structure 800 may have a plurality of transfer event monitor entries 802, each having monitoring information associated with a particular transfer event. The network monitor 102 may use the monitoring information to ensure that particular transfer events occur as expected (e.g., occur in a secure and reliable manner). The network monitor 102 may perform or execute an operation in response to a non-conformant transfer event. In other words, if the network monitor 102 determines that any of the selected transfer events are not carried out or executed according to the information in the example alerts monitor data structure 800, the network monitor 102 may execute a responsive operation.

The example alerts monitor data structure 800 includes a plurality of columns including a data/time column 804, an SLC ID column 806, a rule name column 808, a network identity column 810, a process name column 812, a process ID column 814, an event type column 816, and a message column 818. Although FIG. 8 shows a particular type of and number of columns in the example alerts monitor data structure 800, the example alerts monitor data structure 800 may be implemented with fewer or more types of and number of columns.

Each of the columns of the example alerts monitor data structure 800 indicates a particular characteristic or aspect of a process or file transfer. The date/time column 804 may be used to indicate the date and the time of day that a process or file transfer is scheduled to occur. In an alternative implementation, the date/time column 804 may be implemented using two columns such as, for example, a time of day column and a schedule column (e.g., once-a-day, every Tuesday, etc.). The SLC ID column 806 indicates the SLC that should be used to monitor the particular process or file associated with each of the transfer event monitor entries 802. The network monitor 102 may use the SLC ID values of the SLC ID column 806 to retrieve SLC ID's from a database (e.g., the database 106 of FIG. 1).

The rule name column 808 may be used to indicate the type of operation to perform in response to a predetermined result or event (e.g., a non-conformant transfer) associated with a process or file transfer. For example, the rules in the rule name column 808 may be implemented using logic tests indicating that a particular alert or communication (e.g., an e-mail, an audible alert, a pop-up window, a phone call, a page, etc.) should be made by the network monitor 102 (FIG. 1) if an anomaly, potential error, deviation, or otherwise non-conformant activity is detected in a particular process or file transfer. Some of the rules in the rule name column 808 may cause the network monitor 102 to display messages in the message column 818 via an e-mail, pop-up window, page, phone call, or any other type of alert. Alternatively, the rules indicated in the rule name column 808 may be configured to cause the network monitor 102 and/or the monitoring criteria generator 202 to perform system updates, update or create SLC's, or perform any other automated system operation that may, for example, cause the network monitor 102 to modify the way it monitors process or file transfer events.

The network entity column 810 includes the network ID's of the network entities (e.g., the network entities 104*a-i* of FIGS. 1 and 2) that perform the particular process or file transfer associated with each of the monitor entries 802. The process name column 812 may be used to indicate the names of processes or files associated with the process or file transfers of the monitor entries 802. The process ID column 814 may be used to indicate an identification value of the processes or files associated with the process or file transfers of the monitor entries 802. The event type column 816 may be used to indicate a type of transfer event associated with the monitor entries 802. For example, the transfer event may be a process transfer, a single file transfer, a command transfer, etc. Alternatively or additionally, the event type column 816 may be used to indicate the type of information or files transferred. For example, the event type column 816 may indicate that the transfer event involves financial data, backup data, image data, etc.

FIG. 9 is an example user interface screen that may be used to implement an SLC recommended creation screen 900. The SLC recommended creation screen 900 may be generated by the monitoring criteria generator 202 (FIG. 2) if the monitoring criteria generator 202 determines that an SLC does not exist for a particular process or file transfer. Specifically, the monitoring criteria generator 202 may determine that a new SLC should be created to accurately monitor the particular process or file transfer using recommended monitoring criteria generated based on analyses of the transfer history data structures 500 and 600 (FIGS. 5 and 6), the example transfer time chart 700 (FIG. 7), and/or other similar data structures or charts. In this case, the monitoring criteria generator 202 may generate the SLC recommended creation screen 900 and display the screen 900 to a user to enable a user to accept, modify, or reject the recommendation.

The SLC recommended creation screen 900 may include a plurality of recommended monitoring criteria. The monitoring criteria may include data transfer or file transfer characteristics associated with a particular process or file transfer. The monitoring criteria generator 202 may generate the monitoring criteria based on analyses of the file transfer metadata stored in the transfer history data structures 500 and 600 described above in connection with FIGS. 5 and 6. As shown in FIG. 9, the monitoring criteria in the SLC recommended creation screen 900 includes a monitor time criterion 902, a repetition criterion 904, a transfer type criterion 906, a granularity criterion 908, a source criterion 910, and a destination criterion 912. The quantity and type of monitoring criteria in the SLC recommended creation screen 900 are shown merely by way of example. In alternate implementations, the SLC recommended creation screen 900 may be implemented using fewer or more and any other type of monitoring criteria.

The monitor time criterion 902 may be used to indicate the duration or amount of time required for all of the data associated with a process or file transfer to be transferred or communicated between two of the network entities 104*a-i* (FIG. 1). A value for the monitor time criterion 902 may be recommended or selected using start and end time range values or a duration value. The monitoring criteria generator 202 may determine a recommendation for the monitor time criterion 902 based on analyses of the values stored in the statistics rows 514 and 610 corresponding to the start and end time columns 502, 504, 602, and 604 of the transfer history data structures 500 and 600 of FIGS. 5 and 6 and/or the minimum and maximum time markers 704, 716, 718, and 720 of the example transfer time chart 700 of FIG. 7.

A user may modify the recommended monitor time criterion 902 by selecting the monitor time criterion 902, thus, causing the monitoring criteria generator 202 to generate and pop up or otherwise display a monitor time user-interface display such as the example monitor time selection screen 1000 described below in connection with FIG. 10. In this manner, a user may select whether to define the monitor time criterion 902 using start and end time range values or a duration value.

The repetition criterion 904 may be used to indicate the number of times that a process or file transfer event is scheduled to occur. For example, the repetition criterion 904 may indicate if the transfer event is scheduled to occur once, twice, an indefinite number of times, etc. After determining the number of times that the transfer event is scheduled to occur, the monitoring criteria generator 202 may recommend a schedule for the transfer event using a schedule criterion 914 shown in FIG. 9. The transfer event may occur multiple times per day, per week, per month, etc. A user may modify the recommended schedule by selecting the schedule criterion 914 to cause the monitoring criteria generator 202 to display a calendar or scheduling interface (not shown) that the user may use to select minutes, hours, days, weeks, months, years, etc. associated with when a transfer event is scheduled to occur.

The transfer type criterion 906 may be used to indicate a type of transfer event for which the SLC should be created. The transfer type criterion 906 may be used to indicate whether the transfer event is a single file, a process that includes a plurality of files, a command, etc. The transfer type criterion 906 may also indicate the type or types of files (e.g., database files, text files, encrypted files, financial files, image files, etc.) associated with the transfer event.

The granularity criterion 908 may be used to indicate a level of detail to be monitored for the transfer event. For example, if the transfer event is a process transfer event, the monitoring criteria generator 202 may recommend monitoring each file transfer of the process transfer event to ensure that each file is transferred in a reliable and secure manner. Other granularity criteria recommendations may include monitoring or scanning file header information, monitoring the overall transfer size of a transfer event, etc. If the granularity criterion 908 recommends monitoring each file or individual files associated with a process transfer event, a user may select the individual files to monitor by selecting a file names selector 916.

The source criterion 910 and the destination criterion 912 enable the monitoring criteria generator 202 to selectively monitor process or file transfers between specific source and destination network entities. The source criterion 910 may be used to indicate the source ID, network address, network entity ID of the network entity (e.g., one of the network entities 104*a-i* of FIG. 1) configured to transmit the file or files during a transfer event. The destination criterion 912 may be used to indicate the source ID, network address, network entity ID of the network entity (e.g., one of the network entities 104*a-i* of FIG. 1) configured to receive the file or files during a transfer event. In cases where the monitoring criteria generator 202 determines that a particular process or file transfer event is occurring between more than two network entities, the source and destination criteria 910 and 912 may include multiple network addresses. Alternatively, a plurality of SLC may exist for the process or file transfer events. In this manner, each of the plurality of SLC may be associated with a particular pair of network entities 104*a-i* and configured to monitor the process or file transfer event when it is performed by that pair of network entities 104*a-i*.

The SLC recommended creation screen 900 also has a plurality of user-selectable buttons including an accept button 918, a modify button 920, a reject button 922, a save button 924, and a print button 926. The accept button 918, the modify button 920, and the reject button 922 enable a user to accept, modify, or reject a recommended SLC. For example, a user may select the accept button 918 if the user agrees that an SLC should be created to monitor a particular transfer event using the recommended criterion indicated in the SLC recommended creation screen 900. Alternatively, the user may select the modify button 920 if the user believes that an SLC should be created to monitor the transfer event, but with other criterion values that may be provided by the user. In this case, the monitoring criteria generator 202 may unlock the criterion values or otherwise allow the user to change the criterion values. If the user believes that an SLC should not be created, then the user may select the reject button 922.

The save button 924 enables a user to save or export the recommended monitoring criteria to a file such as, for example, a database (e.g., the database 106). In this manner, the recommended monitoring criteria may be imported at a later time to update or create SLC. The print button 926 allows a user to print the recommended monitoring criteria for later review, archiving, etc.

The SLC recommended creation screen 900 also includes an SLC ID parameter field 928. The SLC ID parameter field 928 indicates an SLC ID that will be created if a user selects to create or generate the recommended SLC. The SLC ID may be used by the network monitor 102 (FIG. 1) to retrieve the SLC corresponding to a particular monitored transfer event. As shown in the example alerts monitor data structure 800 of FIG. 8, the SLC ID (e.g., an SLC ID stored in the SLC ID column 806 of FIG. 8) may be used to associate a particular transfer event with a particular rule (e.g., a rule indicated in the rule name column 808 of FIG. 1) and other information stored in the columns of the example alerts monitor data structure 800.

FIG. 10 is an example user interface screen that may be used to implement an example monitor time selection screen 1000. The example monitor time selection screen 1000 may be used to select a typical duration or amount of time required to transfer all of the data associated with a particular transfer event. As described above in connection with FIG. 9, the example monitor time selection screen 1000 may be invoked or displayed in response to a user selecting the monitor time criterion 902 of FIG. 9. The example monitor time selection screen 1000 includes a start time range criterion 1002, an end time range criterion 1004, and a duration criterion 1006. A user may select the amount of time required for a transfer event based on a combination of the start time range criterion 1002 and the end time range criterion 1004 or based on the duration criterion 1006.

The values of the start time range criterion 1002 and the end time range criterion 1004 may be generated based on values stored in the start and end time columns 502, 504, 602, and 604 of FIGS. 5 and 6 and/or based on the minimum and maximum start and end time markers 714, 716, 718, and 720 of FIG. 7. For example, for a process transfer event, a value in the start time range criterion 1002 may be selected as a value stored in a data field corresponding to the MIN row of the statistics rows 514 (FIG. 5) and the start time column 502. Additionally, a value in the end time range criterion 1002 may be selected as a value stored in a data field corresponding to the MAX row of the statistics rows 514 and the end time column 504.

The values of the duration criterion 1006 may be generated based on values stored in the duration columns 512 and 608 of FIGS. 5 and 6. For example, for a file transfer event, a value in the duration criterion 1006 may be selected as a value stored in a data field corresponding to the MIN, AVG, or MAX rows of the statistical rows 610 (FIG. 6) and the duration column 608.

Figure 11:
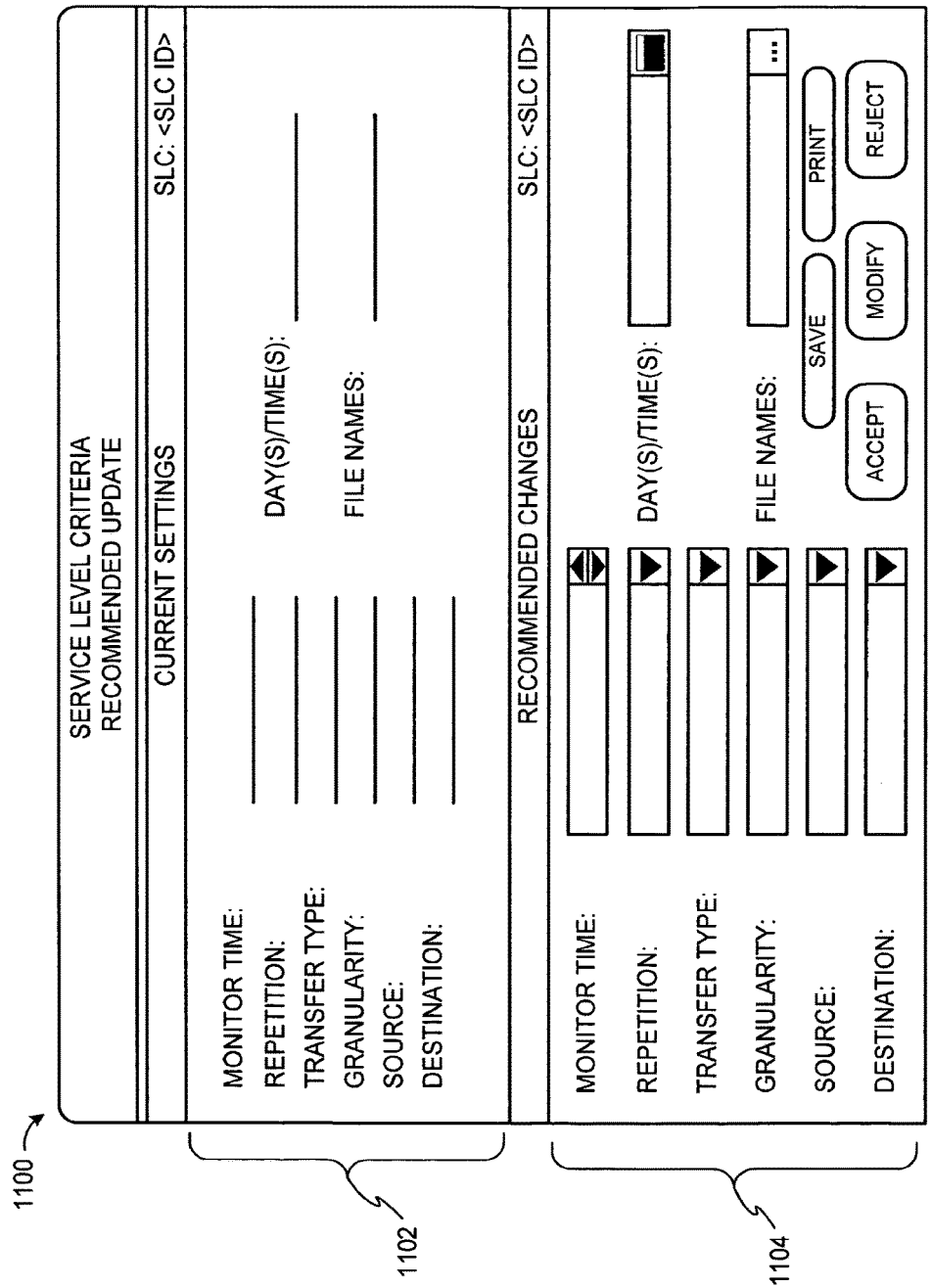
FIG. 11 is an example user interface screen that may be used to implement a service level criteria recommended update screen.

FIG. 11 is an example user interface screen that may be used to implement an SLC recommended update screen 1100. The monitoring criteria generator 202 may generate or create the SLC recommended update screen 1100 if the monitoring criteria generator 202 determines that a process or file transfer event has changed or been modified in such a way that an existing SLC for that transfer event can no longer be used to accurately monitor the transfer event. The monitoring criteria generator 202 may determine that a particular transfer event has changed based on analyses of the transfer history data structures 500 and 600 of FIGS. 5 and 6, the example transfer time chart 700 (FIG. 7), and/or other similar data structures or charts.

Monitoring criteria presented in the SLC recommended update screen 1100 may be substantially similar or identical to the monitoring criteria presented in the SLC recommendation creation screen 900 of FIG. 9. However, the monitoring criteria may be presented in the SLC recommended update screen 1100 in a current criteria section 1102 and a recommended changes section 1104. The current settings section 1102 includes the monitoring criteria values of a current or existing SLC that the network monitor 102 (FIG. 1) uses to monitor a particular transfer event. The monitoring criteria values presented in the recommended changes section 1104 indicate the recommended monitoring criteria values that the monitoring criteria generator 202 recommends for use by the network monitor 102 to monitor subsequent instances of a particular transfer event. A user may change or modify the recommended monitoring criteria values in the recommended changes section 1104 in a manner that is substantially similar or identical to changing or modifying the recommended criteria values of the SLC recommended creation screen 900 of FIG. 9. In addition, a screen that is substantially similar or identical to the example monitor time selection screen 900 may be configured to function cooperatively with the recommended changes section 1104 to select a duration or amount of time required to transfer the data, file, or files associated with a transfer event.

FIGS. 12 through 15 are flow diagrams that depict example methods associated with generating and/or updating file transfer monitoring criteria and SLC. The example methods depicted in the flow diagrams of FIGS. 12 through 15 may be implemented in software, hardware, and/or any combination thereof. For example, the example methods may be implemented in software that is executed via the example processor system 1700 of FIG. 17 and/or a hardware system configured according to the example system 1600 of FIG. 16. Although the example methods are described below as a particular sequence of operations, one or more operations may be rearranged, added, and/or eliminated to achieve the same or similar results. In addition, although the example methods described below in connection with FIGS. 12 through 15 may be implemented in connection with process transfer events or file transfer events, for purposes of simplicity, the example methods are generally described with respect to file transfer events.

Figure 12:
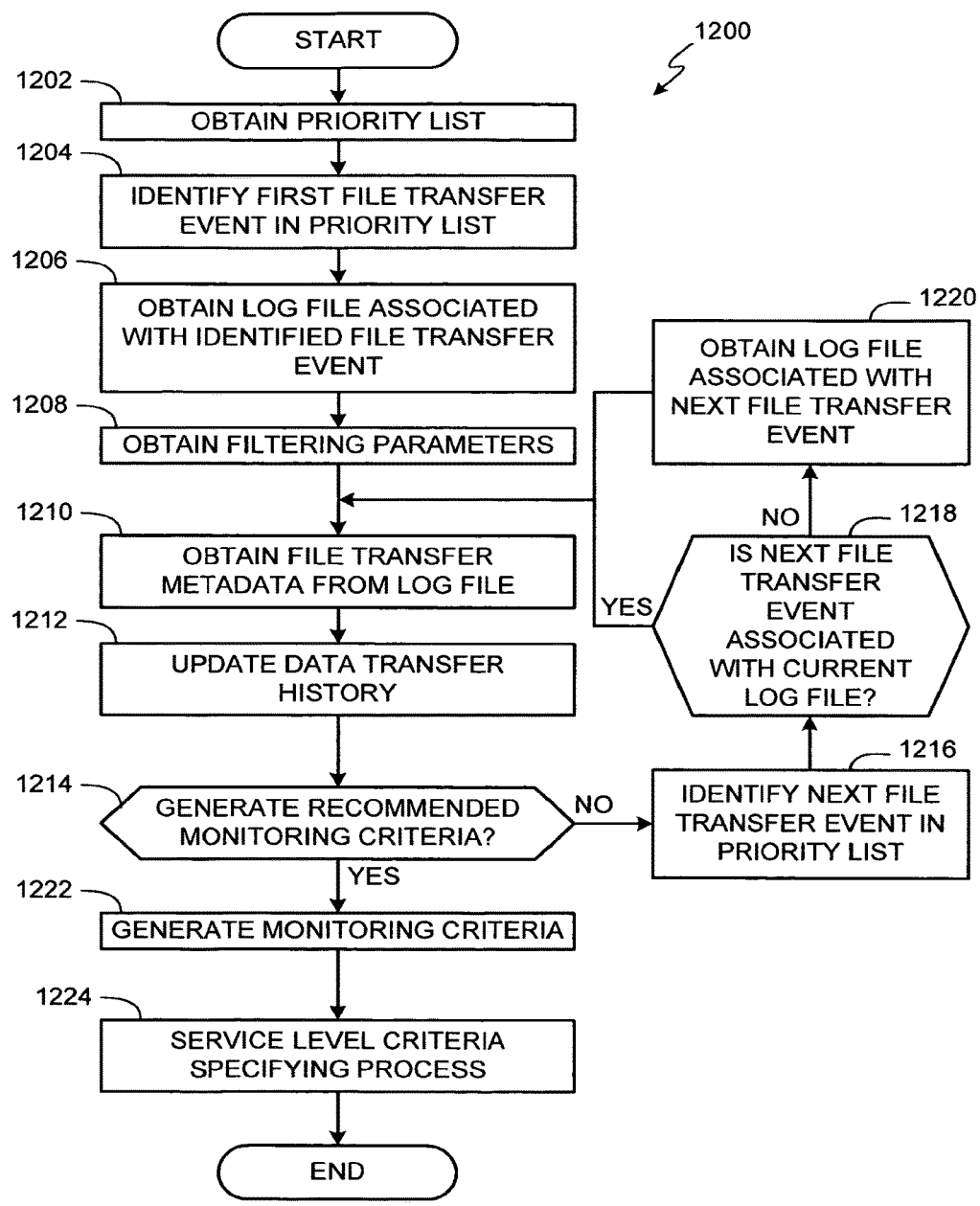
FIG. 12 is a flow diagram of an example method that may be used to monitor data transfer activity and generate or update service level criteria based on the monitored data transfer activity.

FIG. 12 is a flow diagram of an example method 1200 that may be used to monitor process or file transfer activity and generate or update SLC based on file transfer metadata collected in connection with the monitored process or file transfer activity. The operations of the example method 1200 may be executed or performed by the monitoring criteria generator 202 or, alternatively, by a network monitor (e.g., the network monitor 102 of FIG. 1) that is configured to generate monitoring criteria and update and/or create SLC.

During operation, the monitoring criteria generator 202 may obtain a priority list (e.g., the transfer event priority list 210 of FIG. 2) (block 1202) and may then identify a first file transfer event (e.g., a file transfer event having the highest priority) in the priority list (block 1204). As described above in connection with FIG. 2, the priority list 210 may be used to store importance levels or priority levels for each of a plurality of file transfer events. The monitoring criteria generator 202 may then obtain, from a network entity (e.g., one of the network entities 104a-i of FIG. 1), a log file (e.g., one the log files 208a-i of FIG. 2) associated with the file transfer event identified at block 1204 (block 1206). The monitoring criteria generator 202 may obtain log files in response to a request such as, for example, a user input request to start analyzing file transfer metadata associated with process or file transfer events. Alternatively, the monitoring criteria generator 202 may be configured to retrieve log files at predetermined scheduled times (e.g., everyday at midnight), or at times associated with start and end times of process or file transfer events.

The monitoring criteria generator 202 may first obtain the log files associated with file transfer events that are marked in the priority list 210 as having a relatively high importance or marked as relatively critical (i.e., master processes). After obtaining the ones of the log files 208a-i (FIG. 2) corresponding to relatively high priority levels, the monitoring criteria generator 202 may then obtain the ones of the log files 208a-i having file transfers of relatively lower priority. By first obtaining the ones of the log files 208a-i associated with relatively high priority file transfers, the monitoring criteria generator 202 can quickly monitor or analyze the high-priority file transfer events logged in those ones of the log files 208a-i to detect any potential errors and, in turn, enable a user to respond quickly to any transfer errors.

The monitoring criteria generator 202 may then obtain filtering parameters (block 1208) associated with analyzing the file transfer metadata in the log files 208a-i. The filtering parameters may be specified by a user via the filter(s) parameters field 414 of the example analyses configuration screen 400 of FIG. 4 and may be used by the monitoring criteria generator 202 to detect patterns or trends in file transfer metadata.

The monitoring criteria generator 202 then obtains raw file transfer metadata from the log file (block 1210) obtained in connection with block 1206. The monitoring criteria generator 202 may obtain the raw file transfer metadata of the file transfer event identified at block 1204 based on the filtering parameters obtained in connection with block 1208. For example, as shown in the example log file 300 (FIG. 3), the network entities 104a-i may store many types of file transfer metadata in the log files 208a-i (FIG. 2). However, a user may specify via the filter(s) parameters field 414 of the example analyses configuration screen 400 to analyze only a subset of the types of file transfer metadata. For example, if a selected filter parameter specifies analyses of the information stored in the file size(s) column 318, the monitoring criteria generator 202 may extract only or at least the information stored in the files size(s) column 318.

The monitoring criteria generator 202 may then update data transfer history (block 1212) based on the raw file transfer metadata obtained in connection with block 1210. For example, the monitoring criteria generator 202 may update the file transfer history data structure 600 (FIG. 6) based on processed and/or raw file transfer metadata as described in greater detail below in connection with FIG. 13.

The monitoring criteria generator 202 then determines if it should generate recommended monitoring criteria (block 1214). The monitoring criteria generator 202 may determine whether to generate monitoring criteria based on whether the analyses configuration of the particular file transfer event specifies that an SLC specifying process should be triggered. For example, as described above in connection with the example analyses configuration screen 400 (FIG. 4), a user may specify, via the trigger SLC specifying process parameter 410, whether monitoring a particular file transfer should trigger an SLC specifying process. Additionally or alternatively, the monitoring criteria generator 202 may determine, based on an amount of collected file transfer metadata, whether to generate monitoring criteria. The accuracy of assessments or analyses of the file transfer metadata may be directly related to the amount of file transfer metadata that has been collected. Therefore, the monitoring criteria generator 202 may be configured to generate monitoring criteria only after a specified, predetermined, or otherwise sufficient amount of file transfer metadata has been collected in, for example, the transfer history data structures 500 and 600 (FIGS. 5 and 6). In some implementations of the monitoring criteria generator 202, a user may specify how much file transfer metadata must be collected prior to analyzing the file transfer metadata for purposes of generating monitoring criteria. In the same or other implementations, the amount of file transfer metadata required to generate monitoring criteria may be specified by the types of filters or filtering parameters specified in the filter(s) parameters field 414 of FIG. 4.

If the monitoring criteria generator 202 determines that it should not generate monitoring criteria, then the monitoring criteria generator 202 may identify a next file transfer event in the priority list 210 obtained at block 1202 (block 1216). The next file transfer event may be the file transfer event marked in the priority list as having the next highest priority level relative to the previously identified file transfer event. After identifying the next file transfer event, the monitoring criteria generator 202 determines whether the next file transfer event is associated with the current log file (e.g., the log file obtained at block 1206) (block 1218). The monitoring criteria generator 202 may determine whether the next file transfer event is associated with the current log file by comparing a process ID or file name of the next file transfer event with process ID's or file names logged in the log file (e.g., process ID's logged in the process ID metadata column 312 of FIG. 3 or file names logged in the file name(s) metadata column 314 of FIG. 3).

If the monitoring criteria generator 202 determines that the next file transfer event is not associated with the current log file, the monitoring criteria generator 202 may obtain, from one of the network entities 104*a-i* (FIGS. 1 and 2), one of the log files 208*a-i* associated with the next file transfer event identified at block 1216 (block 1220). After obtaining another log file at block 1220 or if at block 1218 the monitoring criteria generator 202 determines that the next file transfer event is associated with the current log file, control is passed back to block 1210.

If at block 1214 the monitoring criteria generator 202 determines that it should generate recommended monitoring criteria, then the monitoring criteria generator 202 generates monitoring criteria (block 1222) based on the file transfer metadata stored in a transfer history data structure such as, for example, one of the transfer history data structures 500 and 600 (FIGS. 5 and 6). An example implementation of the generate monitoring criteria operation or method of block 1222 is described in greater detail below in connection with FIG. 14.

The monitoring criteria generator 202 then performs an SLC specifying process (block 1224) to create or update an SLC based on the monitoring criteria generated in connection with block 1222 and/or user input. An example implementation of the SLC specifying process of block 1224 is described in greater detail below in connection with FIG. 15. After performing the SLC specifying process, the example method 1200 of FIG. 12 ends.

Figure 13:
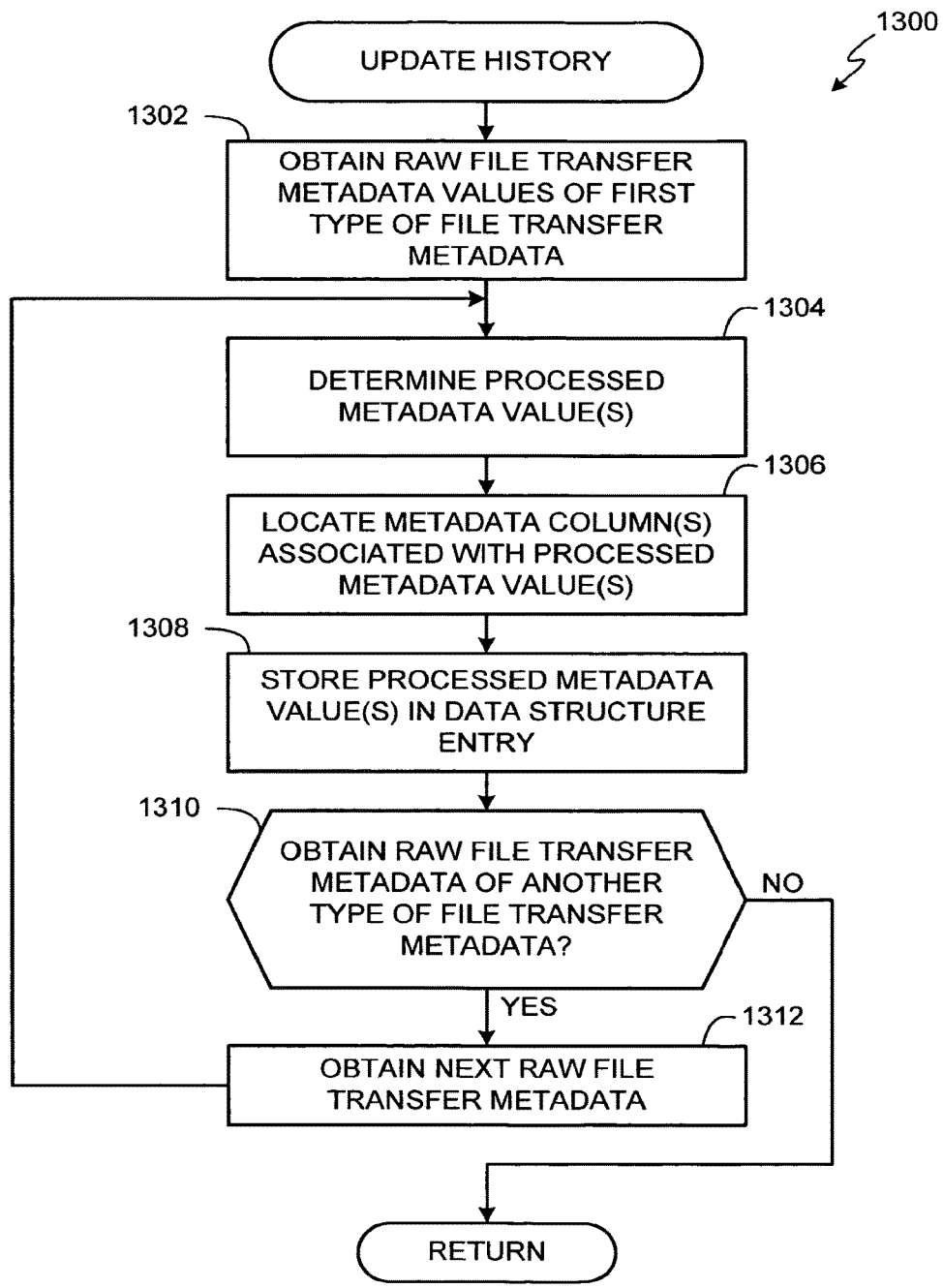
FIG. 13 is a flow diagram of an example update history method that may be implemented in connection with the example method of FIG. 12.

FIG. 13 is a flow diagram of an example update history method 1300 that may be implemented in connection with the example method of FIG. 12. The example update history method 1300 may be used to implement the operation of block 1212 of FIG. 12 which, as described above, updates data transfer history such as file transfer history in, for example, the file transfer history data structure 600 of FIG. 6.

Initially, the monitoring criteria generator 202 obtains raw file transfer metadata values associated with a first type of file transfer metadata (block 1302). The first type of file transfer metadata may be any one of the types associated with the metadata columns (e.g., the data/time metadata column 304, the file name(s) metadata column 314, the transfer size metadata column 320, the timestamp metadata column 322, etc.) described above in connection with the example log file 300 of FIG. 3. For example, the first type of file transfer metadata may be selected from the types of raw file transfer metadata that were obtained from the log file (e.g., one of the log files 208*a-i* of FIG. 2) at block 1210 of FIG. 12.

The monitoring criteria generator 202 may then determine one or more processed metadata values (e.g., start time, end time, file transfer duration, etc.) associated with the raw file transfer metadata values previously obtained (e.g., the raw file transfer metadata values obtained at block 1302) (block 1304). For example, the processed metadata values may be determined as described above in connection with FIG. 3. After determining the one or more processed metadata values, the monitoring criteria generator 202 may locate one or more metadata columns in the file transfer history data structure 600 (FIG. 6) corresponding to the one or more processed metadata values determined at block 1304 (block 1306). For example, if the monitoring criteria generator 202 obtained raw timestamp metadata values at block 1302 and then determined a start time metadata value, an end time metadata value, and a file transfer duration metadata value at block 1304 based on the raw timestamp metadata values, the monitoring criteria generator 202 may locate the start time column 602, the end time column 604, and the duration column 608 the file transfer history data structure 600 at block 1306.

After locating the one or more metadata columns at block 1306, the monitoring criteria generator 202 may store the one or more processed metadata values determined at block 1304 in a data structure entry in data fields corresponding to the one or more metadata columns (block 1308). The monitoring criteria generator 202 may then determine if it should obtain raw file transfer metadata values of another type of file transfer metadata (block 1310). If the monitoring criteria generator 202 determines that it should obtain raw file transfer metadata values of another type of file transfer metadata, then the monitoring criteria generator 202 obtains the next raw file transfer metadata (block 1312). Otherwise, the update history method 1300 returns control to a calling function or process such as, for example, the example method 1200 of FIG. 12.

Figure 14:
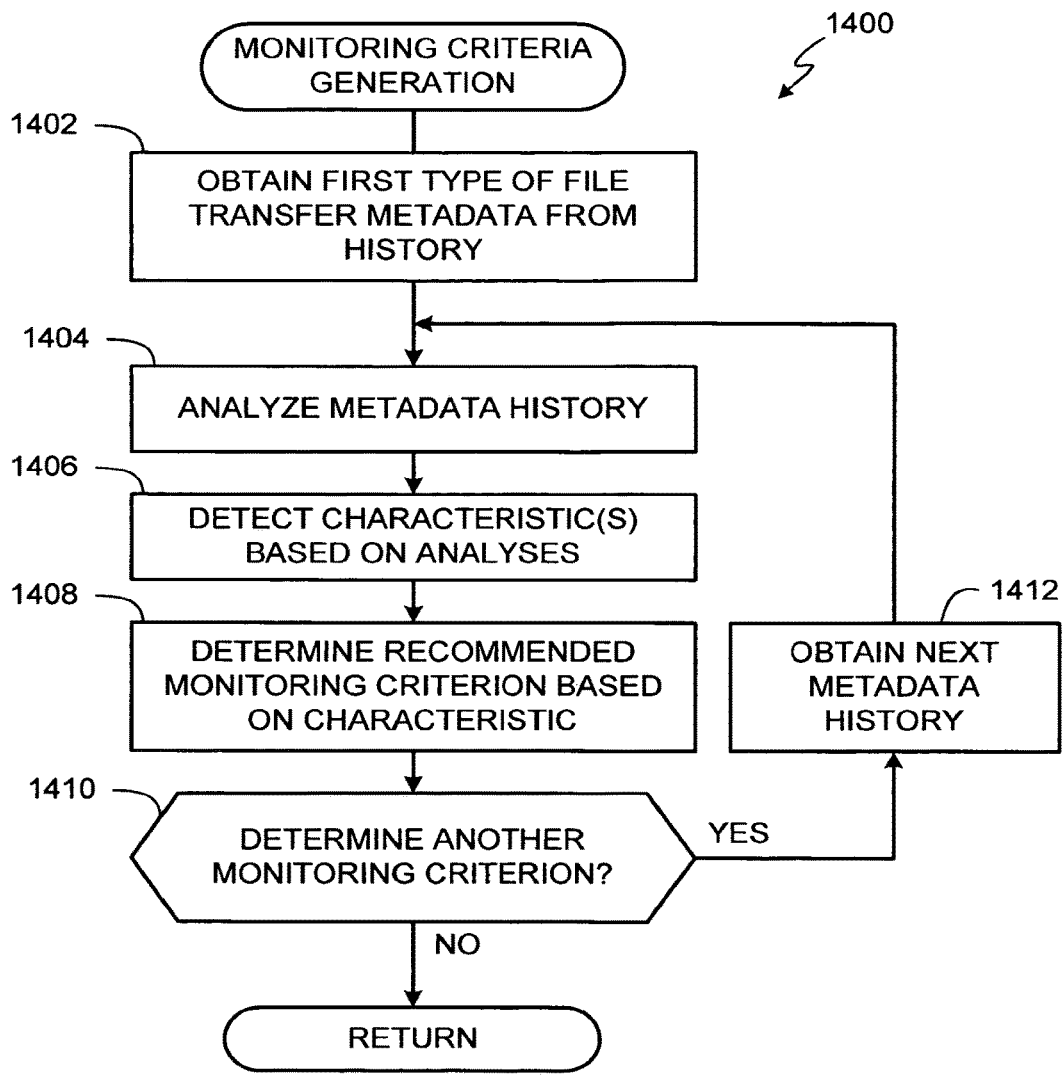
FIG. 14 is a flow diagram of an example monitoring criteria generation method that may be implemented in connection with the example method of FIG. 12.

FIG. 14 is a flow diagram of an example monitoring criteria generation method 1400 that may be implemented in connection with the example method of FIG. 12. In particular, the example monitoring criteria generation method 1400 may be used to implement the operation of block 1222 of FIG. 12 to generate monitoring criteria. Initially, the monitoring criteria generator 202 may obtain processed file transfer metadata associated with a first type of file transfer metadata from the file transfer history data structure 500 (FIG. 5) (block 1402). The type of file transfer metadata may be selected, for example, from any of the metadata columns (e.g., start time column 602, end time column 604, file size column 606, duration column 608) of FIG. 6 or any other metadata column in alternative implementations of the file transfer history data structure 600 (FIG. 6). The monitoring criteria generator 202 may obtain all of the process metadata stored in a selected metadata column or may only obtain the MIN, AVG, and MAX metadata values stored in the statistical rows 610 (FIG. 6).

The monitoring criteria generator 202 then analyzes the metadata history obtained at block 1402 (block 1404). The monitoring criteria generator 202 may analyze the metadata history based on filters and filter parameters specified in the filter(s) parameters field 414 of the example analyses configuration screen 400 of FIG. 4. Analyses may be performed to detect patterns or trends associated with file transfer events.

The monitoring criteria generator 202 may then detect or determine one or more characteristics of file transfer activity based on one or more analyses performed at block 1404 (block 1406). For example, if the monitoring criteria generator 202 obtains start time metadata at block 1402, the monitoring criteria generator 202 may determine an earliest start time characteristic.

The monitoring criteria generator 202 may then determine a recommended monitoring criterion based on the one or more characteristics determined at block 1406 (block 1408). For example, if the monitoring criteria generator 202 determines an earliest start time characteristic at block 1406, then the monitoring criteria generator 202 may determine a start time monitoring criterion specifying the earliest time at which a file transfer event may occur. The start time monitoring criterion may be subsequently recommended to a user via the start time range criterion 1002 of the example monitor time selection screen 1000 (FIG. 10).

The monitoring criteria generator 202 may then determine whether to determine another monitoring criterion (block 1410). The monitoring criteria generator 202 may determine that it needs to determine another monitoring criterion if it has not determined criterion values for all of the monitoring criteria represented in the recommendation screens 900 and 1100 of FIGS. 9 and 11. Alternatively or additionally, the monitoring criteria generator 202 may determine whether it needs to determine another monitoring criterion based on the information provided in the filter(s) parameters field 414 of FIG. 4. For example, if a user specifies in the filter(s) parameters field 414 that the monitoring criteria generator 202 should determine a plurality of monitoring criteria for a corresponding process ID, the monitoring criteria generator 202 may determine at block 1410 that it needs to determine another monitoring criterion unless it has already determined criterion values for all of the monitoring criteria specified in the filter(s) parameters field 414. If the monitoring criteria generator 202 determines that it should determine another monitoring criterion then the monitoring criteria generator 202 obtains a next type of metadata (block 1412) from, for example, the file transfer metadata history data structure 600 (FIG. 6) and control is returned to block 1404. Otherwise, if the monitoring criteria generator 202 determines that it should not determine another monitoring criterion control is returned to a calling function or process such as, for example, the example method 1200 of FIG. 12.

Figure 15:
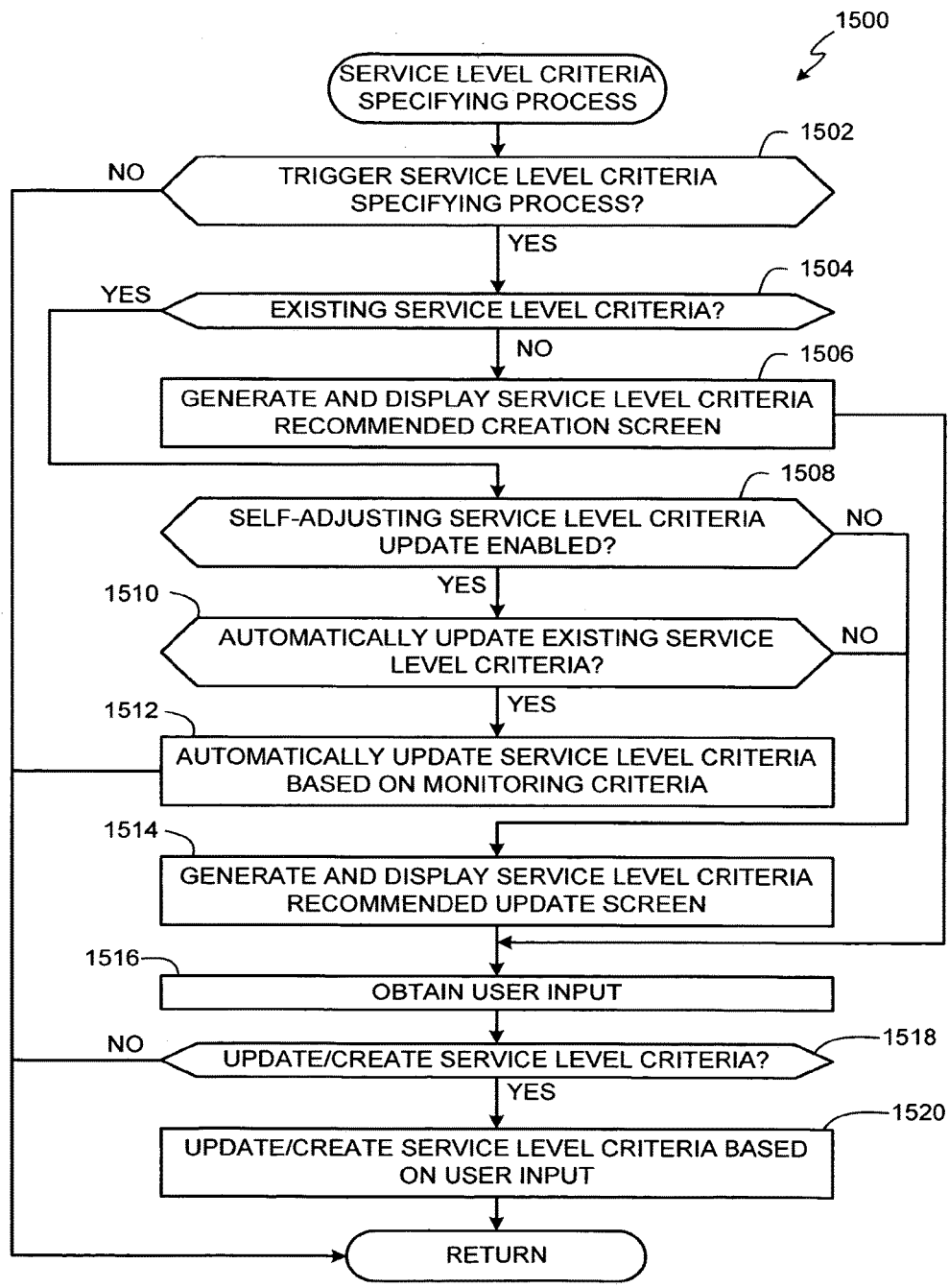
FIG. 15 is a flow diagram of an example service level criteria specifying process that may be implemented in connection with the example method of FIG. 12.

FIG. 15 is a flow diagram of an example SLC specifying process 1500 that may be implemented in connection with the example method of FIG. 12. In particular, the example SLC specifying process 1500 may be used to implement the SLC specifying process of block 1224 of FIG. 12. As described below, the example SLC specifying process 1500 may be used to update an existing SLC or to create a new SLC based on recommended monitoring criteria generated by the monitoring criteria generator 202. For example, the monitoring criteria generator 202 may specify (e.g., update or create) SLC based on the monitoring criteria generated in connection with the example monitoring criteria generation method 1400 described above in connection with FIG. 14.

Initially, the monitoring criteria generator 202 determines if it should trigger an SLC specifying process for a currently identified file transfer event (e.g., a file transfer event identified at block 1204 or block 1216 of FIG. 12) (block 1502). The monitoring criteria generator 202 may determine whether to trigger an SLC specifying process based on user input provided for the trigger SLC specifying process field 410 of the example analyses configuration screen 400 (FIG. 4). If the monitoring criteria generator 202 determines that it should not trigger an SLC specifying process, control is returned to a calling function or process such as, for example, the example method 1200 of FIG. 12.

If the monitoring criteria generator 202 determines at block 1502 that it should trigger an SLC specifying process, then the monitoring criteria generator 202 determines whether the identified file transfer event is associated with existing SLC (block 1504). The monitoring criteria generator 202 may determine if any of a plurality of existing SLC is associated with the identified file transfer event based on the information provided in the existing SLC ID field 412 in the example analyses configuration screen 400 of FIG. 4. If the monitoring criteria generator 202 determines that none of the existing SLC correspond to the identified file transfer event, then the monitoring criteria generator 202 may generate and display an SLC recommended creation screen (e.g., the example SLC recommended creation screen 900 of FIG. 9) (block 1506). For example, the monitoring criteria generator 202 may generate the example SLC recommended creation screen 900 by entering, filling in, or otherwise writing to one or more criterion fields (e.g., the monitor time criterion 902, the repetition criterion 904, the transfer type criterion 906, etc. of FIG. 9) the one or more recommended monitoring criteria generated in connection with the example monitoring criteria generation method 1400 of FIG. 14.

If the monitoring criteria generator 202 determines at block 1504 that one of the existing SLC corresponds to the identified file transfer event, the monitoring criteria generator 202 then determines whether the self-adjusting SLC update feature is enabled for the identified file transfer event (block 1508). The monitoring criteria generator 202 may determine if the self-adjusting SLC update feature is enabled based on whether a user selected the self-adjusting SLC update field 416 of FIG. 4.

If the self-adjusting SLC update feature is enabled, the monitoring generator 202 determines whether it should automatically update the existing SLC (block 1510). The monitoring generator 202 may determine whether it should update the existing SLC based on the one or more recommended monitoring criteria, one or more corresponding existing monitoring criteria of the existing SLC, and one or more user-defined self-adjust thresholds. The monitoring criteria generator 202 may obtain the self-adjust thresholds from the self-adjust threshold(s) field 418 of FIG. 4. In an example in which a recommended monitoring criterion includes a start time, the monitoring criteria generator 202 may determine whether to update the existing SLC by determining the time difference between the recommended start time criteria and an existing start time criteria and then comparing the time difference to a user-supplied self-adjusting threshold provided for the start time criteria. If the time difference is less than the threshold, the monitoring criteria generator 202 may determine at block 1510 that it should update the start time criterion in the existing SLC.

If the monitoring criteria generator 202 determines that it should automatically update the existing SLC, then the monitoring criteria generator 202 automatically updates the existing SLC based on the recommended monitoring criteria (block 1512). Although not shown, the operations of blocks 1510 and 1512 may be repeated for each of the recommended monitoring criteria associated with the existing SLC. In other words, for a plurality of recommended monitoring criterion, only some of the monitoring criteria of the SLC may be updated if all of the recommended monitoring criteria do not conform to the user supplied self-adjusting thresholds.

If the monitoring criteria generator 202 determines at block 1508 that the self-adjusting SLC update feature is not enabled or determines at block 1510 that it should not automatically update the existing SLC, then the monitoring criteria generator 202 may generate and display an SLC recommended update screen (e.g., the example SLC recommended update screen 1100 of FIG. 11) (block 1514). The monitoring criteria generator 202 may generate the example SLC recommended update screen 1100 using the one or monitoring criteria generated in connection with the example monitoring criteria generation method 1400 of FIG. 14. In cases where the monitoring criteria generator 202 determines at block 1508 that the self-adjusting SLC update feature is enabled, but afterwards determines at block 1510 that some or all of the recommended monitoring criteria should not be used to automatically update the existing SLC, the monitoring criteria generator 202 may generate the example SLC recommended update screen 1100 based on the recommended monitoring criteria that were not used to update the existing SLC at block 1512.

After a user analyzes and provides user input based on the recommended monitoring criteria presented via the example SLC recommended creation screen 900 (block 1506) or via the example SLC recommended update screen 1100 (block 1514) (e.g., after the user provides user input via the accept button 918, the modify button 920, or the reject button 922 of FIG. 9), the monitoring criteria generator 202 may obtain the user input (block 1516). The monitoring criteria generator 202 may then determine based on the user input whether to update or create the SLC (block 1518). For example, the monitoring criteria generator 202 may update or create the SLC if the user input indicates that the user selected the accept button 918 (FIG. 9) and/or the modify button 920 (FIG. 9).

If the monitoring criteria generator 202 determines that it should update or create the SLC, the monitoring criteria generator 202 may update an existing SLC or create a new SLC based on the user input and the recommended monitoring criteria (block 1518). Otherwise, if the monitoring criteria generator 202 determines that it should not update or create the SLC or after updating or creating the SLC at block 1518, control is returned to a calling function or process such as, for example, the example method 1200 of FIG. 12.

Figure 16:
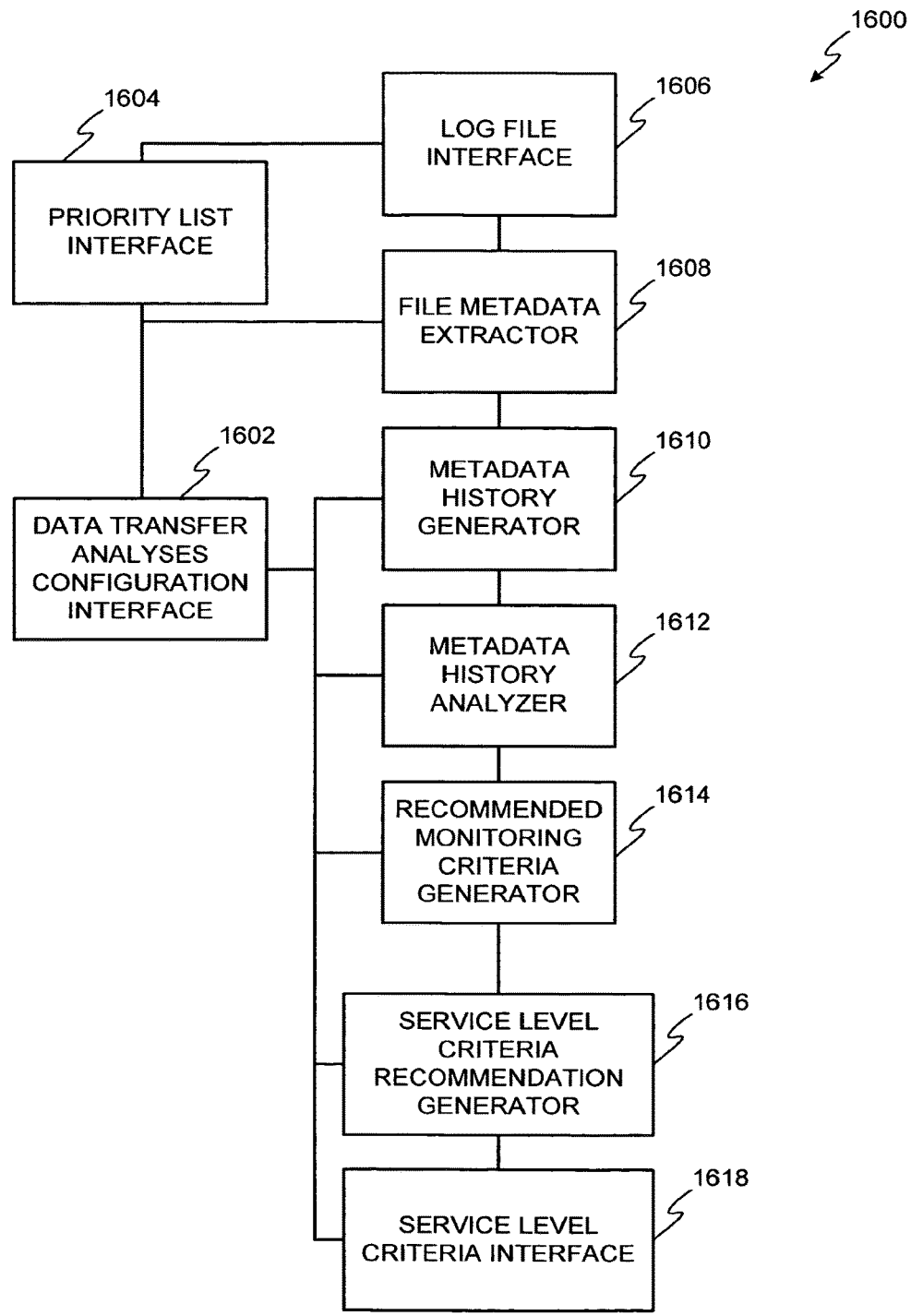
FIG. 16 is a functional block diagram of an example system that may be used to implement the systems and methods described herein.

FIG. 16 is a functional block diagram of an example system 1600 that may be used to implement the systems and methods described herein. The structures shown in FIG. 16 may be implemented using any desired combination of hardware and/or software. For example, one or more integrated circuits, discrete semiconductor components, or passive electronic components may be used. Additionally or alternatively, some or all, or parts thereof, of the structures of FIG. 16 may be implemented using instructions, code, or other software and/or firmware, etc. stored on a computer-readable medium that, when executed by, for example, a processor system (e.g., the processor system 1710 of FIG. 17), perform the methods disclosed herein.

In general, the example system 1600 may be configured to monitor data transfer events (e.g., process and data transfer events), generate monitoring criteria based on those data transfer events, and create or update SLC based on the monitoring criteria. For example, the example system 1600 may be used to implement the example monitoring criteria generator 202 (FIG. 2) based on the example methods described above in connection with FIGS. 12 through 15.

Now turning in detail to FIG. 16, the example system 1600 includes data transfer analyses configuration interface 1602, a priority list interface 1604, a log file interface 1606, a file metadata extractor 1608, a metadata history generator 1610, a metadata history analyzer 1612, a recommended monitoring criteria generator 1614, an SLC recommendation generator 1616, and an SLC interface 1618, all of which may be communicatively coupled as shown. The data transfer analyses configuration interface 1602 may be used to generate and retrieve data transfer analyses configuration records, files, etc. For example, the data transfer analyses configuration interface 1602 may be configured to obtain configuration information provided by a user via, for example, the example configuration analyses screen 400 of FIG. 4 and store the configuration information in records of a database (e.g., the database 106 of FIG. 1), in files, or in any other data structure suitable for storing the configuration parameters. The data transfer analyses configuration interface 1602 may also be configured to retrieve or obtain the configuration information from storage for use in monitoring data transfers such as, for example, process or file transfer events. The data transfer analyses configuration interface 1602 may provide the configuration information to other blocks of the example system 1600 to analyze file transfer metadata associated with data transfer events as specified by a user.

The priority list interface 1604 may be configured to obtain a priority list such as, for example, the transfer event priority list 210 (FIG. 2) and store to the priority list or obtain from the priority list priority levels of different transfer events. The priority list interface 1604 may obtain the priority list 210 and priority levels of different file transfer events as described above in connection with blocks 1202, 1204, and 1218 of the example method 1200 of FIG. 12. For example, when a user specifies via, for example, the example analyses configuration screen 400, that a particular process or file transfer event should be monitored, the priority list interface 1604 may obtain a priority level of that particular process or file transfer event from the data transfer analyses configuration interface 1602 and store the priority level in the priority list 210. Additionally, when the monitoring criteria generator 202 analyzes process or file transfer events, the priority list interface 1604 may obtain priority levels from the priority list 210 to determine the priority levels of each transfer event to be monitored.

The log file interface 1606 may be configured to obtain log files (e.g., the log files 208*a-i* of FIG. 2) from network entities (e.g., the network entities 104*a-i* of FIGS. 1 and 2). The log file interface 1606 may obtain log files as described above in connection with blocks 1206 and 1220 of the example method 1200 of FIG. 12. For example, the log file interface 1606 may obtain from the priority list 210 process ID's or file names (e.g., process ID's provided by a user via the process ID parameter field 402 of FIG. 4) and associated source and/or destination addresses (e.g., source or destination addresses provided via the source and destination parameter fields 404 and 406 of FIG. 4) based on the priority levels of the data transfer events. The log file interface 1606 may then determine from which of the network entities 104*a-i* to retrieve log files associated with the data transfer events identified in the priority list 210.

The file metadata extractor 1608 may be configured to extract raw file transfer metadata from the log files obtained by the log file interface 1606. The file metadata extractor 1608 may determine which raw file transfer metadata to obtain from the log files based on configuration information (e.g., filter parameters) obtained from the data transfer analyses configuration interface 1602 and data transfer event priority levels obtained from the priority list interface 1604. More specifically, the file metadata extractor 1608 may be configured to obtain raw file transfer metadata from the log files as described above in connection with blocks 1208 and 1210 of the example method 1200 of FIG. 12.

The metadata history generator 1610 may be configured to generate processed file transfer metadata based on the raw file transfer metadata obtained from the file metadata extractor 1608 and store the processed file transfer metadata in transfer history data structures (e.g., the example process and file transfer history data structures 500 and 600 of FIGS. 5 and 6). The metadata history generator 1610 may be configured to update transfer history data structures as described above in connection with the example update history method 1300 of FIG. 13. In some implementations, for each monitored data transfer event, the metadata history generator 1610 may obtain from the data transfer analyses configuration interface 1602 one or more filter parameters (e.g., filter parameters provided via the filter(s) parameters field 414 of FIG. 4) and store only the metadata specified by those filter parameters.

The metadata history analyzer 1612 may be configured to analyze the processed file transfer metadata stored in the transfer history data structures 500 and 600 and to detect trends or patterns in the processed file transfer metadata. The metadata history analyzer 1612 may be configured to obtain processed file transfer metadata and analyze the processed file transfer metadata as described above in connection with blocks 1402, 1404, 1406, and 1412 of the example monitoring criteria generation method 1400 of FIG. 14. For example, the metadata history analyzer 1612 may obtain filter parameters from the data transfer analyses configuration interface 1602 and use any analysis filters or techniques specified by a user to detect the patterns or trends.

The recommended monitoring criteria generator 1614 may be configured to generate recommended monitoring criteria based on the trends or patterns detected by the metadata history analyzer 1612. The recommended monitoring criteria generator 1614 may generate recommended monitoring criteria as described above in connection with block 1408 of the example monitoring criteria generation method 1400 of FIG. 14. For example, the recommended monitoring criteria generator 1614 may obtain filter parameters from the data transfer analyses configuration interface 1602 and generate the monitoring criteria based on the filter parameters.

The SLC recommendation generator 1616 may be configured to generate recommendations to create or update SLC based on the recommended monitoring criteria generated by the recommended monitoring criteria generator 1614. The SLC recommendation generator 1616 may recommend updating or creating SLC as described above in connection with the example SLC specifying process 1500 of FIG. 15. The SLC recommendation generator 1616 may obtain from the data transfer analyses configuration interface 1602 configuration information regarding whether SLC exist for data transfer events. If an SLC exists for a particular data transfer event, the SLC recommendation generator 1616 may recommend updating the SLC via, for example, the example SLC recommended update screen 1100. If an SLC does not exist for a particular data transfer event, the SLC recommendation generator 1616 may recommend creating an SLC via, for example, the example SLC recommended creation screen 900 of FIG. 9.

The SLC interface 1618 may be configured to perform an SLC specifying process based on the recommended monitoring criteria generated by the recommended monitoring criteria generator 1614. The SLC interface 1618 may be configured to perform SLC specifying processes as described above in connection with the example SLC specifying process 1500 of FIG. 15. The SLC interface 1618 may be configured to update or create SLC using a manual process and/or a self-adjusting SLC update process. For example, the SLC interface 1618 may obtain from the data transfer analyses configuration interface 1602 configuration information regarding whether the self-adjusting SLC update feature is enabled for a particular process or file transfer. If the self-adjusting SLC update feature is enabled, the SLC interface 1618 may then obtain self-adjusting threshold values from the data transfer analyses configuration interface 1602 to determine whether to automatically update an existing SLC as described in greater detail above in connection with blocks 1508, 1510, and 1512 of FIG. 15. If the self-adjusting SLC update feature is not enabled, the SLC interface 1618 may display to a user the example SLC recommended creation screen 900 of FIG. 9 and subsequently obtain user input regarding the recommended monitoring criteria. Based on the user input, the SLC interface 1618 may then create or not create an SLC for a particular process or file transfer event.

Figure 17:
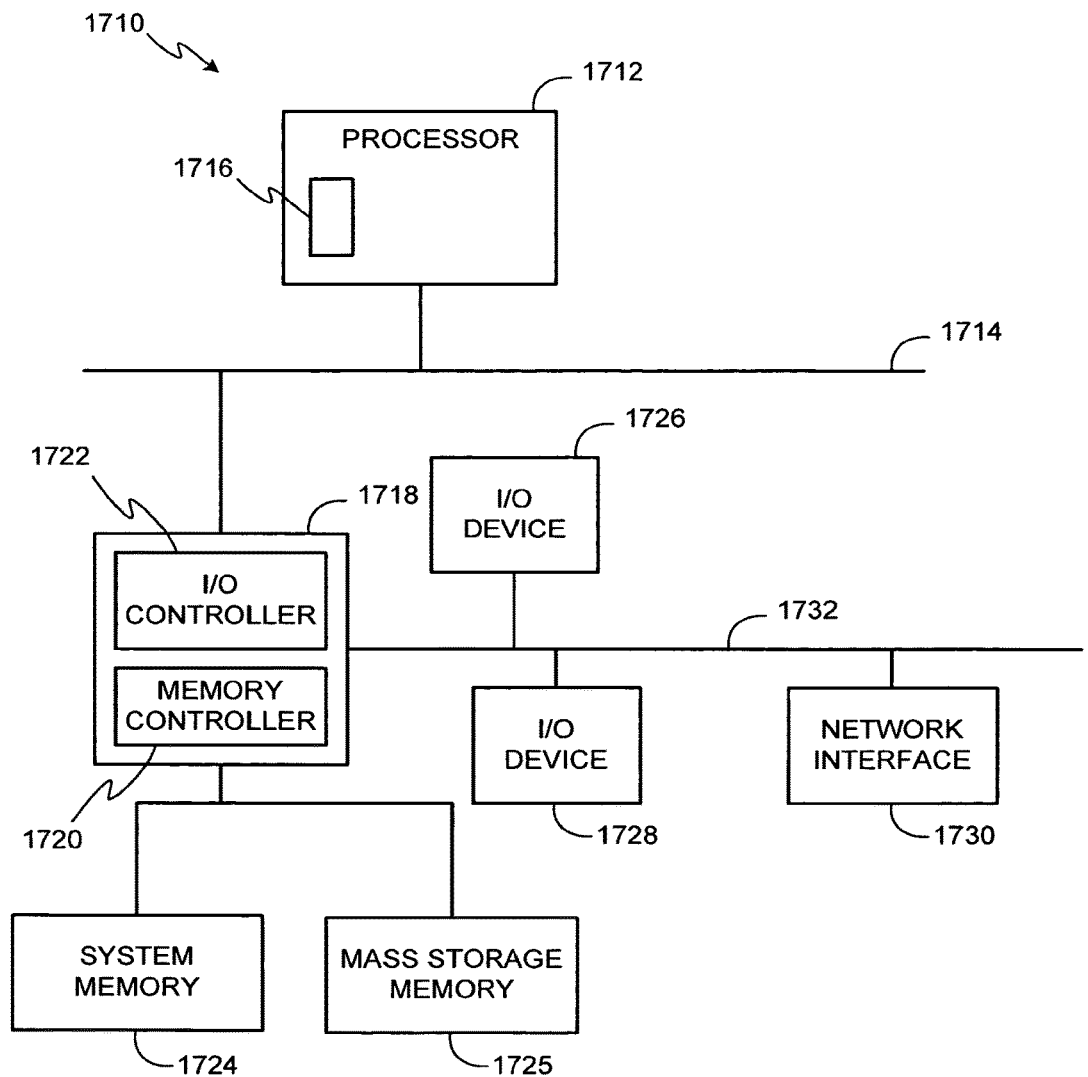
FIG. 17 is a block diagram of an example processor system that may be used to implement the systems and methods described herein.

FIG. 17 is a block diagram of an example processor system that may be used to implement the system and methods described herein. As shown in FIG. 17, the processor system 1710 includes a processor 1712 that is coupled to an interconnection bus 1714. The processor 1712 includes a register set or register space 1716, which is depicted in FIG. 17 as being entirely on-chip, but which could alternatively be located entirely or partially off-chip and directly coupled to the processor 1712 via dedicated electrical connections and/or via the interconnection bus 1714. The processor 1712 may be any suitable processor, processing unit or microprocessor. Although not shown in FIG. 17, the system 1710 may be a multi-processor system and, thus, may include one or more additional processors that are identical or similar to the processor 1712 and that are communicatively coupled to the interconnection bus 1714.

The processor 1712 of FIG. 17 is coupled to a chipset 1718, which includes a memory controller 1720 and an input/output (I/O) controller 1722. As is well known, a chipset typically provides I/O and memory management functions as well as a plurality of general purpose and/or special purpose registers, timers, etc. that are accessible or used by one or more processors coupled to the chipset 1718. The memory controller 1720 performs functions that enable the processor 1712 (or processors if there are multiple processors) to access a system memory 1724 and a mass storage memory 1725.

The system memory 1724 may include any desired type of volatile and/or non-volatile memory such as, for example, static random access memory (SRAM), dynamic random access memory (DRAM), flash memory, read-only memory (ROM), etc. The mass storage memory 1725 may include any desired type of mass storage device including hard disk drives, optical drives, tape storage devices, etc.

The I/O controller 1722 performs functions that enable the processor 1712 to communicate with peripheral input/output (I/O) devices 1726 and 1728 and a network interface 1730 via an I/O bus 1732. The I/O devices 1726 and 1728 may be any desired type of I/O device such as, for example, a keyboard, a video display or monitor, a mouse, etc. The network interface 1730 may be, for example, an Ethernet device, an asynchronous transfer mode (ATM) device, an 802.11 device, a DSL modem, a cable modem, a cellular modem, etc. that enables the processor system 1710 to communicate with another processor system.

While the memory controller 1720 and the I/O controller 1722 are depicted in FIG. 17 as separate functional blocks within the chipset 1718, the functions performed by these blocks may be integrated within a single semiconductor circuit or may be implemented using two or more separate integrated circuits.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A non-transitory machine accessible medium having instructions stored thereon that, when executed, cause a machine to:
   execute a monitoring criteria generator in memory of a server communicatively coupled to a local network or to a plurality of distributed networks;
   specifying in a configuration screen, a transfer event priority list specifying an importance level or priority level for each file transfer between network entities in the local network or plurality of distributed networks, each of the network entities comprising one of a plurality of file transfer log files stored in respective memory of a corresponding one of the network entities, each of the log files storing therein log entries generated by a file transfer application of the corresponding one of the network entities and storing the priority list in fixed storage of the server;
   identify by the monitoring criteria generator a priority level of a data transfer event associated with a first network entity based on the transfer event priority list, wherein the priority level indicates a priority of monitoring the data transfer event;
   obtain by the monitoring criteria generator first file metadata from the first network entity based on the priority level, wherein the first file metadata is based on a previous monitoring of the data transfer event between the first network entity and a second network entity;
   detect by the monitoring criteria generator a characteristic associated with the data transfer event based on the first file metadata; and
   generate by the monitoring criteria generator a first monitoring criterion based on the characteristic, wherein the first monitoring criterion is associated with selectively monitoring data transfer activity between the first network entity and the second network entity and wherein the the selective monitoring of the event transfers occurs based upon the criterion.

2. The non-transitory machine accessible medium as defined in claim 1, wherein the instructions, when executed, further cause the machine to:
   obtain second file metadata from the first network entity;
   detect a data transfer pattern based on the first file metadata and the second file metadata; and
   generate a second monitoring criterion based on the data transfer pattern.

3. The non-transitory machine accessible medium as defined in claim 1, wherein the characteristic is associated with at least one of a file name, a file type, a file size, a file transfer time, and a file transfer duration.

4. The non-transitory machine accessible medium as defined in claim 1, wherein the instructions, when executed, causing the machine to obtain the first file metadata comprises:
   obtaining a log file from the first network entity; and
   extracting the first file metadata from the log file.

5. The non-transitory machine accessible medium as defined in claim 1, wherein the instructions, when executed, further cause the machine to:
   generate a service level criteria update recommendation based on the first monitoring criterion; and
   output the service level criteria update recommendation via a user interface.

6. The non-transitory machine accessible medium as defined in claim 1, wherein the instructions, when executed, further cause the machine to communicate the first monitoring criterion to a network monitoring system.

7. The non-transitory machine accessible medium as defined in claim 1, wherein the instructions, when executed causing the machine to generate the first monitoring criterion based on the characteristic, comprises:
   obtaining file transfer metadata associated with a first type of file transfer metadata from a file transfer history data structure;
   analyzing the file transfer metadata; detecting one or more characteristics of file transfer activity based upon analyzing the file transfer metadata; and
   determining a recommended monitoring criterion based upon the detected one or more characteristics.

8. The non-transitory machine accessible medium as defined in claim 2, wherein the instructions, when executed, further cause the machine to update a transfer history data structure using the first and second file metadata.

9. The non-transitory machine accessible medium as defined in claim 2, wherein the instructions, when executed, further cause the machine to update at least one of a plurality of service level criteria based on at least one of the first monitoring criterion and the second monitoring criterion.

10. The non-transitory machine accessible medium as defined in claim 9, wherein the at least one of the plurality of service level criteria is updated using one of an automatic process and a manual process.

11. The non-transitory machine accessible medium as defined in claim 7, wherein the instructions, when executed causing the machine to generate the first monitoring criterion based on the characteristic, further comprises determining whether to determine another monitoring criterion.

* * * * *